US012311677B2

(12) United States Patent
Iwanami et al.

(10) Patent No.: US 12,311,677 B2
(45) Date of Patent: May 27, 2025

(54) IMAGE FORMING APPARATUS, IMAGE FORMING METHOD, AND STORAGE MEDIUM

(71) Applicants: Satoshi Iwanami, Kanagawa (JP); Kentaro Uehara, Kanagawa (JP)

(72) Inventors: Satoshi Iwanami, Kanagawa (JP); Kentaro Uehara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 189 days.

(21) Appl. No.: 18/105,819

(22) Filed: Feb. 4, 2023

(65) Prior Publication Data

US 2023/0249470 A1 Aug. 10, 2023

(30) Foreign Application Priority Data

Feb. 9, 2022 (JP) ................................ 2022-019095

(51) Int. Cl.

| | |
|---|---|
| ***B41J 2/21*** | (2006.01) |
| ***B41J 2/135*** | (2006.01) |
| ***B41J 11/00*** | (2006.01) |
| ***B41J 29/393*** | (2006.01) |

(52) U.S. Cl.

CPC ............ *B41J 2/2107* (2013.01); *B41J 2/135* (2013.01); *B41J 11/007* (2013.01); *B41J 29/393* (2013.01); *B41J 2029/3935* (2013.01)

(58) Field of Classification Search

CPC ..... B41J 11/0015; B41J 2/2117; B41J 2/2114; B41J 2/2132; B41J 2/2107; B41J 11/008; B41J 11/007; B41J 19/207; B41J 2/135; B41J 29/393; B41J 2029/3935

See application file for complete search history.

(56) References Cited

U.S. PATENT DOCUMENTS

| | | | |
|---|---|---|---|
| 2015/0085305 | A1 | 3/2015 | Suzuki et al. |
| 2015/0109646 | A1 | 4/2015 | Yokozawa et al. |
| 2018/0141329 | A1 | 5/2018 | Aoyagi et al. |
| 2018/0147835 | A1 | 5/2018 | Nakamura et al. |
| 2019/0163112 | A1 | 5/2019 | Nikaku et al. |
| 2019/0166274 | A1 | 5/2019 | Ishii et al. |
| 2019/0166275 | A1 | 5/2019 | Ishii et al. |

(Continued)

FOREIGN PATENT DOCUMENTS

| | | |
|---|---|---|
| JP | 2018-083334 | 5/2018 |
| JP | 2018-083404 | 5/2018 |

*Primary Examiner* — Jannelle M Lebron

(74) *Attorney, Agent, or Firm* — Duft & Bornsen, PC

(57) ABSTRACT

An image forming apparatus includes a head, processing circuitry, and a reader. The head includes a first nozzle, a second nozzle, and a third nozzle at a position different from the first nozzle in a conveyance direction of a recording medium. The circuitry controls relative movement of the medium and the head along a main scanning direction and relative movement of a conveyance amount between the medium and the head along the conveyance direction. The circuitry controls the head to form a first test pattern with color ink discharged from the first nozzle, form a second test pattern with color ink discharged from the third nozzle, and form a mask image overlapping on or under the first pattern and overlapping on or under the second pattern with base ink discharged from the second nozzle. The reader reads positions of the first pattern and the second pattern on the medium.

8 Claims, 22 Drawing Sheets

(56) References Cited

U.S. PATENT DOCUMENTS

| | | | |
|---|---|---|---|
| 2019/0283446 A1* | 9/2019 | Tsuda | B41J 2/04558 |
| 2019/0294935 A1 | 9/2019 | Iwanami et al. | |
| 2020/0023648 A1* | 1/2020 | Gotou | B41J 2/145 |
| 2020/0101736 A1 | 4/2020 | Satoh et al. | |

* cited by examiner

IMAGE FORMING APPARATUS, IMAGE FORMING METHOD, AND STORAGE MEDIUM

CROSS-REFERENCE TO RELATED APPLICATION

This patent application is based on and claims priority pursuant to 35 U.S.C. § 119(a) to Japanese Patent Application No. 2022-019095, filed on Feb. 9, 2022, in the Japan Patent Office, the entire disclosure of which is hereby incorporated by reference herein.

BACKGROUND

Technical Field

Embodiments of the present disclosure relate to an image forming apparatus, an image forming method, and a storage medium.

Related Art

Conventionally, there has been known an image forming apparatus that forms an image on a recording medium by controlling relative movement of a head and the recording medium along a main scanning direction and a conveyance direction of the recording medium intersecting the main scanning direction, and discharge of ink by the head.

As a configuration of the above-described image forming apparatus, a configuration is known in which the actual distance of a positional shift amount corresponding to a positional shift amount in an image captured by an imager is calculated, and a conveyance amount of an object is corrected in each moving direction of a carriage. In this image forming apparatus, a pair of first markers is formed by a head, a test pattern in which a second marker is formed by a head having an inclination different from that at the time of forming the pair of first markers is imaged, a ratio between a distance between the first markers and a positional shift amount of the second marker is calculated from a captured image, and an actual distance of the positional shift amount of the second marker is calculated on the basis of the ratio to adjust a parameter related to a conveyance amount.

SUMMARY

In an embodiment of the present disclosure, an image forming apparatus includes a head, processing circuitry, and a reader. The head includes a first nozzle to discharge color ink, a second nozzle to discharge base ink, and a third nozzle disposed at a position different from the first nozzle in a conveyance direction of a recording medium, to discharge color ink. The processing circuitry controls relative movement of the recording medium and the head along a main scanning direction intersecting the conveyance direction, relative movement of a conveyance amount between the recording medium and the head along the conveyance direction, and discharge of the color ink and the base ink by the head. The processing circuitry further controls the head to form a first test pattern on the recording medium with the color ink discharged from the first nozzle, form a second test pattern on the recording medium with the color ink discharged from the third nozzle, and form a mask image overlapping on or under the first test pattern and overlapping on or under the second test pattern with the base ink discharged from the second nozzle. The reader reads positions of the first test pattern formed on the recording medium with the color ink discharged from the first nozzle and the second test pattern formed on the recording medium with the color ink discharged from the third nozzle.

In another embodiment of the present disclosure, there is provided an image forming method to be executed by an image forming apparatus including a head. The image forming method includes discharging, controlling relative movement, controlling the head, and reading. The discharging discharges color ink from a first nozzle of the head, base ink from a second nozzle of the head, and color ink from a third nozzle of the head disposed at a position different from the first nozzle in a conveyance direction of the recording medium. The controlling relative movement controls relative movement of the recording medium and the head along a main scanning direction intersecting the conveyance direction, relative movement of a conveyance amount between the recording medium and the head along the conveyance direction, and discharge of the color ink and base ink by the head. The controlling the head controls the head to form a first test pattern on the recording medium with the color ink discharged from the first nozzle, to form a second test pattern on the recording medium with the color ink discharged from the third nozzle, and to form a mask image overlapping on or under the first test pattern and overlapping on or under the second test pattern with the base ink discharged from the second nozzle. The reading reads positions of the first test pattern formed on the recording medium with the color ink discharged from the first nozzle and the second test pattern formed on the recording medium with the color ink discharged from the third nozzle.

In still another embodiment of the present disclosure, a non-transitory storage medium storing a plurality of instructions which, when executed by one or more processors, causes the processors to perform a method. The method includes discharging, controlling relative movement, controlling a head, and reading. The discharging discharges color ink from a first nozzle of the head, base ink from a second nozzle of the head, and color ink from a third nozzle of the head disposed at a position different from the first nozzle in a conveyance direction of a recording medium. The controlling relative movement controls relative movement of the recording medium and the head along a main scanning direction intersecting the conveyance direction, relative movement of a conveyance amount between the recording medium and the head along the conveyance direction, and discharge of the color ink and the base ink by the head. The controlling the head controls the head to form a first test pattern on the recording medium with the color ink discharged from the first nozzle, to form a second test pattern on the recording medium with the color ink discharged from the third nozzle, and to form a mask image overlapping on or under the first test pattern and overlapping on or under the second test pattern with the base ink discharged from the second nozzle. The reading reads positions of the first test pattern formed on the recording medium with the color ink discharged from the first nozzle and the second test pattern formed on the recording medium with the color ink discharged from the third nozzle.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
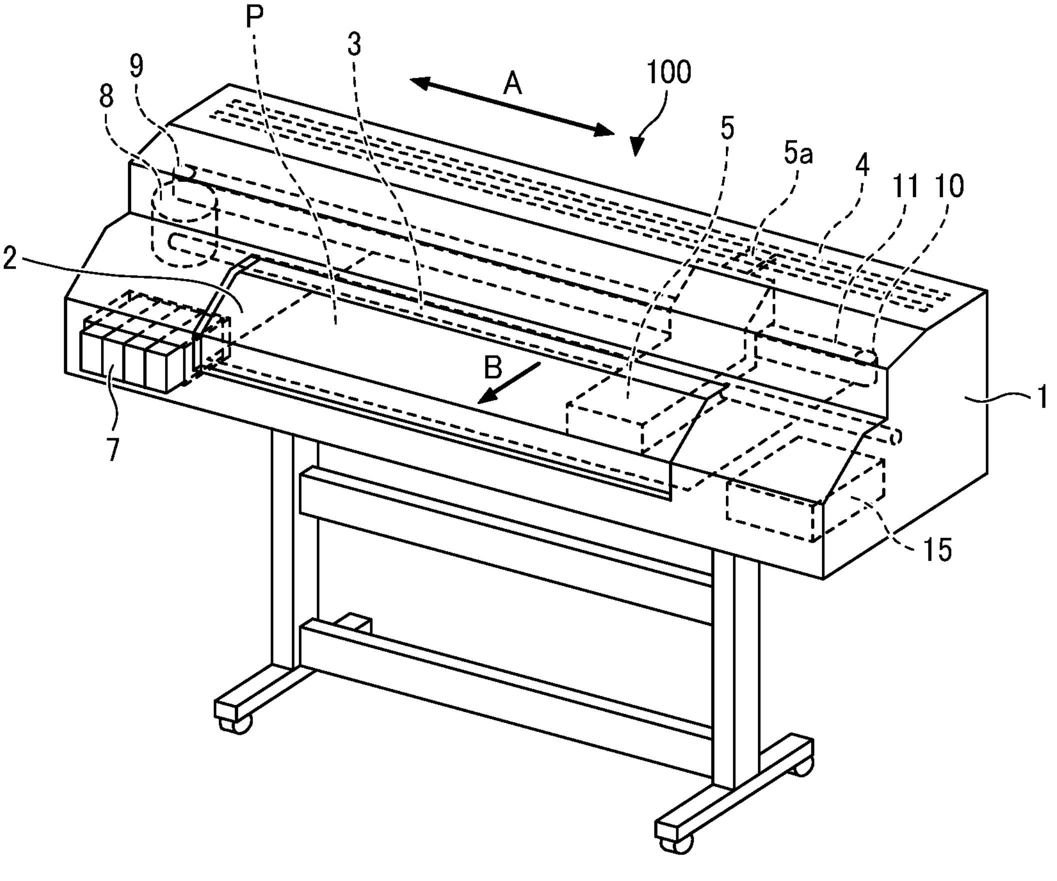
FIG. 1 is a perspective view of an inside of an image forming apparatus according to an embodiment of the present disclosure in a see-through manner.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

Hereinafter, embodiments for carrying out the invention will be described with reference to the drawings. In the drawings, identical components are denoted by identical reference numerals, and redundant description thereof may be omitted.

In addition, the embodiments described below exemplify an image forming apparatus for embodying the technical idea of the present invention, and the present invention is not limited to the embodiments described below. The dimensions, materials, shapes, relative arrangements and the like of components described below are intended to be illustrative and are not intended to limit the scope of the invention thereto, unless otherwise specified.

The sizes, positional relations, and the like of components illustrated in the drawings may be exaggerated for clarity of description.

Embodiments

Configuration Example of Image Forming Apparatus

Figure 2:
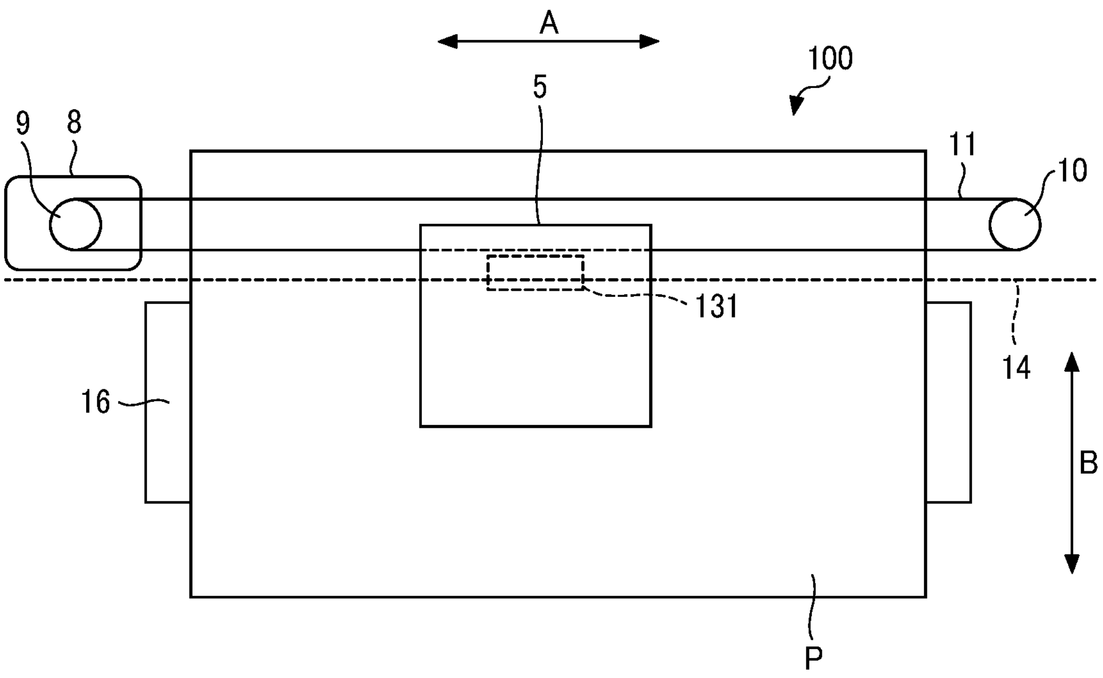
FIG. 2 is a top view of an internal configuration example of the image forming device in FIG. 1.
Figure 3:
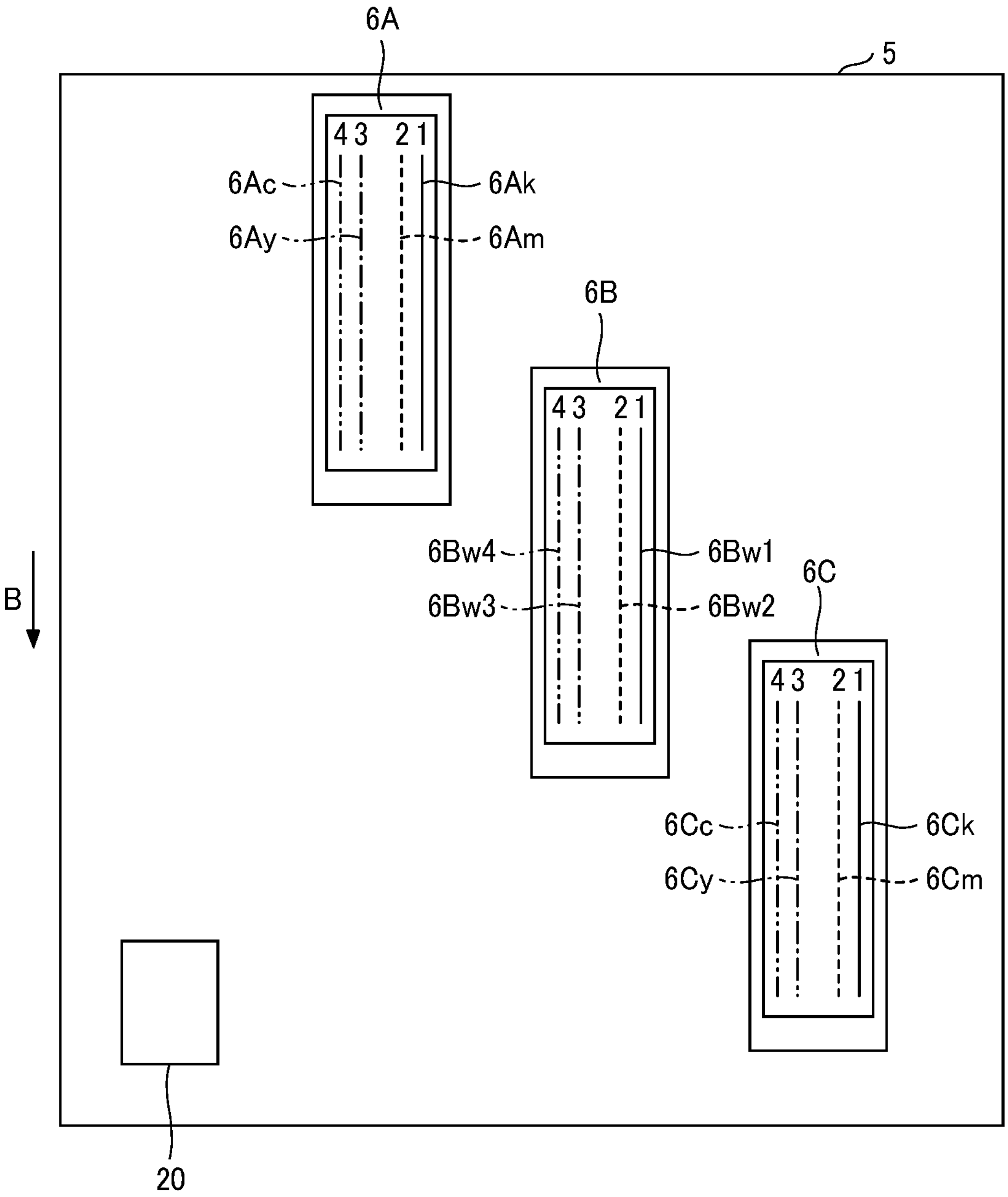
FIG. 3 is a diagram illustrating a configuration example of a carriage according to the embodiment of the present disclosure.

A configuration of the image forming apparatus 100 according to an embodiment will be described with reference to FIGS. 1 to 3. FIG. 1 is a perspective view of the inside of the image forming apparatus 100 in a see-through manner. FIG. 2 is a top view of an example of an internal configuration of the image forming apparatus 100. FIG. 3 is a diagram illustrating an example of a configuration of the carriage 5.

As illustrated in FIG. 1, the image forming apparatus 100 includes the carriage 5 that reciprocates in a main scanning direction (a direction of an arrow A in the drawing). The carriage 5 is supported by a main guide rod 3 extending along the main scanning direction. The carriage 5 is provided with a coupling piece 5*a*. The coupling piece 5*a* is engaged with a sub guide member 4 provided in parallel with the main guide rod 3 to stabilize the posture of the carriage 5.

The carriage 5 is coupled to a timing belt 11 stretched between a driving pulley 9 and a driven pulley 10. The driving pulley 9 is rotated by driving of a main scanning motor 8. The driven pulley 10 has a mechanism for adjusting the distance to the driving pulley 9, and has a function of applying a predetermined tension to the timing belt 11.

The carriage 5 reciprocates in the main scanning direction when the timing belt 11 performs a feeding operation by driving of the main scanning motor 8. For example, as illustrated in FIG. 2, the moving amount and moving speed of the carriage 5 are controlled on the basis of an encoder value that is output by a main scanning encoder sensor 131 in the carriage 5 detecting marks on the encoder sheet 14.

As illustrated in FIG. 3, the carriage 5 includes heads 6A, 6B, and 6C. Each of the heads 6A, 6B, and 6C includes a first nozzle that discharges color ink, a second nozzle that discharges base ink, and a third nozzle that is arranged at a position different from the first nozzle in a sub-scanning direction and discharges color ink. The sub-scanning direction is a direction intersecting the main scanning direction, and is an example of the conveyance direction.

The head 6A includes one nozzle row 6Ay in which a large number of nozzles for discharging yellow (Y) ink are arranged, one nozzle row 6Ac in which a large number of nozzles for discharging cyan (C) ink are arranged, one nozzle row 6Am in which a large number of nozzles for discharging magenta (M) ink are arranged, and one nozzle row 6Ak in which a large number of nozzles for discharging black (K) ink. Similarly, the head 6C includes nozzle rows 6Cy, 6Cc, 6Cm, and 6Ck. The head 6B includes four nozzle rows 6Bw1, 6Bw2, 6Bw3, and 6Bw4 in which a large number of nozzles for discharging white (W) ink are arranged.

Hereinafter, these heads 6A, 6B, and 6C will be collectively referred to as heads 6. The heads 6 are supported by the carriage 5 such that their discharge faces (nozzle faces) are oriented downward (toward a recording medium P).

Cartridges 7, which are ink supply bodies for supplying ink to the heads 6, are not loaded in the carriage 5 but are arranged at a predetermined position in the image forming apparatus 100. The cartridges 7 and the heads 6 are connected by pipes, and ink is supplied from the cartridges 7 to the heads 6 via the pipes.

As illustrated in FIG. 2, the image forming apparatus 100 includes a platen 16 at a position facing the discharge faces of the heads 6. The platen 16 supports the recording medium P when discharging the ink from the heads 6 onto the recording medium P. The platen 16 has a large number of through holes penetrating therethrough in the thickness direction, and has rib-shaped protrusions surrounding the individual through holes. The image forming apparatus 100 can suppress the recording medium P from falling off from the platen 16 by operating a suction fan provided on the side of the platen 16 opposite to the surface supporting the recording medium P.

The image forming apparatus 100 nips the recording medium P by a conveyance roller driven by a sub-scanning motor 12 (see FIG. 13), and intermittently conveys the recording medium P on the platen 16 along the sub-scanning direction (direction of arrow B in FIG. 2).

The image forming apparatus 100 has a large number of nozzles arranged in the sub-scanning direction in the heads 6. In the present embodiment, the image forming apparatus 100 intermittently conveys the recording medium P in the sub-scanning direction, selectively drives the nozzles of the heads 6 according to the image data while reciprocating the carriage 5 in the main scanning direction during stoppage of the recording medium P, and discharges ink from the heads 6 onto the recording medium P on the platen 16, thereby to form an image on the recording medium P.

The image forming apparatus 100 also includes a maintenance mechanism 15 for maintaining the reliability of the heads 6. The maintenance mechanism 15 performs cleaning and capping of the discharge faces of the heads 6, removal of unnecessary ink from the head 6, and the like.

As illustrated in FIG. 3, the carriage 5 includes an imager 20 for imaging a test pattern TP (see FIG. 15) formed on the recording medium P.

The imager 20 is an example of a reader that reads the test pattern TP formed on the recording medium P with the color ink discharged from the heads 6. In the present embodiment, in particular, the imager 20 reads the positions of a first test pattern and a second test pattern included in the test pattern TP.

The image forming apparatus 100 includes the above-described components inside an outer case 1. The outer case 1 includes an openable and closable cover member 2. The image forming apparatus 100 is configured to allow access to each component in the outer case 1 by opening the cover member 2 at the time of maintenance or occurrence of a paper jam.

The imager 20 illustrated in FIG. 3 may have a reference chart captured simultaneously with the test pattern TP, or may not have the reference chart. The reference chart is, for example, a chart for calculating colorimetric values of the test pattern TP using RGB values of reference patches (see FIG. 9).

First Example of Imager

Figure 4:
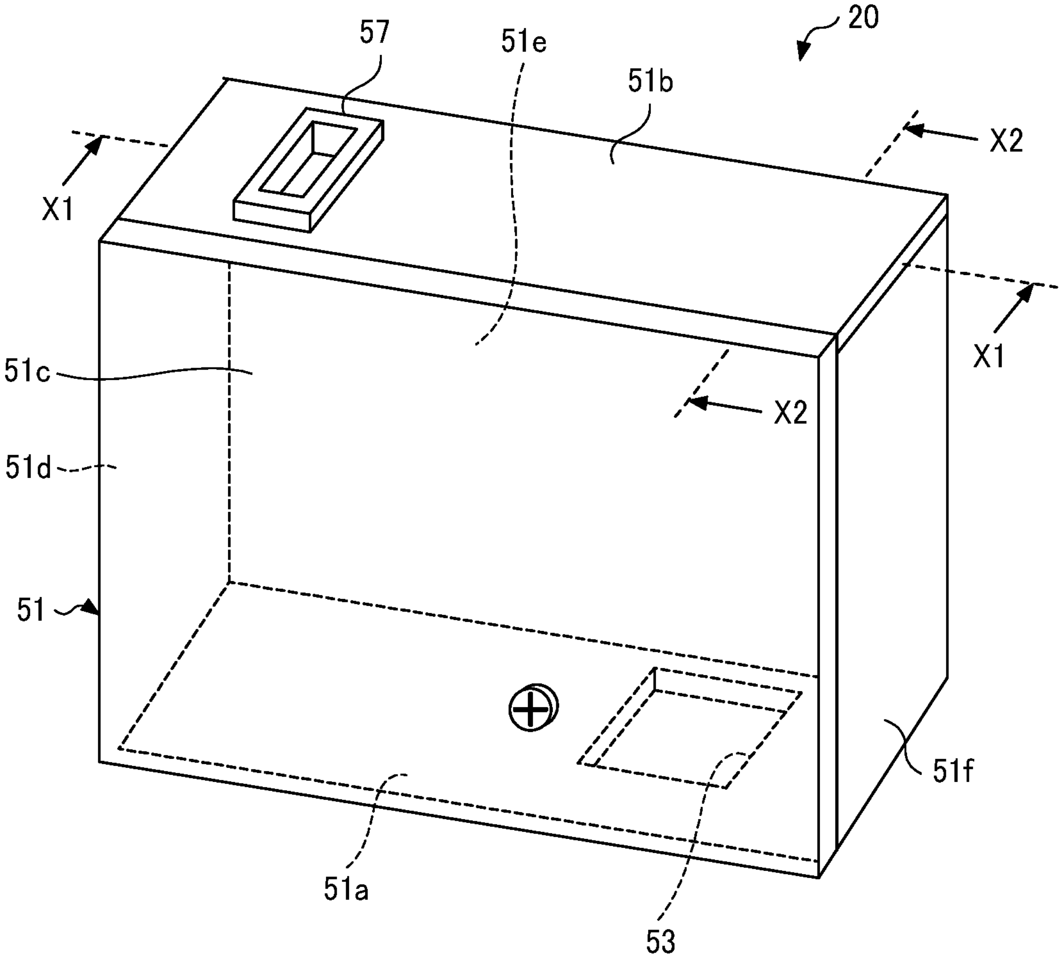
FIG. 4 is a perspective view of a configuration example of an imager according to the embodiment of the present disclosure.
Figure 5:
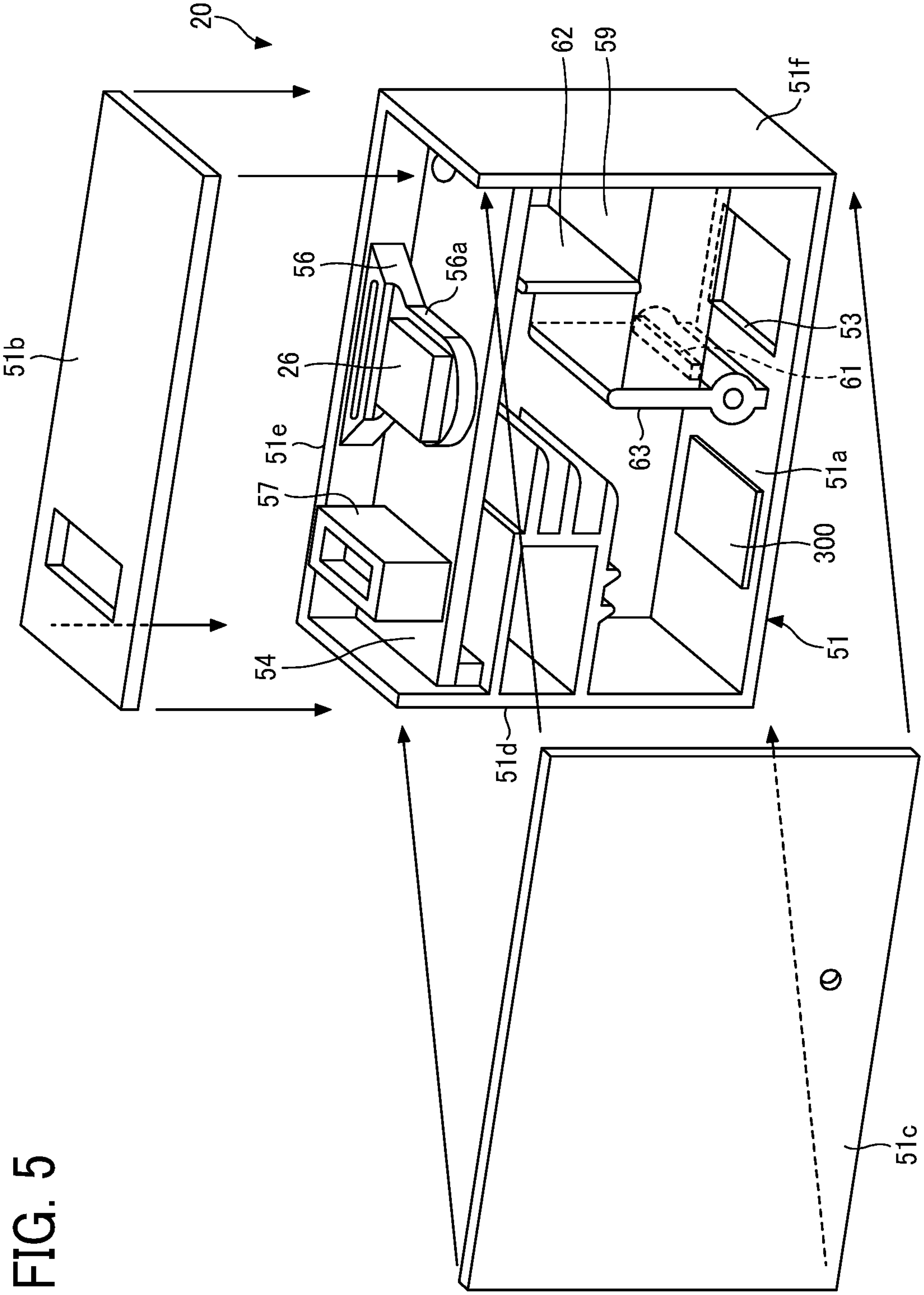
FIG. 5 is an exploded perspective view of a configuration example of the imager according to the embodiment of the present disclosure.

A specific example of the imager 20 having the reference chart will be described with reference to FIGS. 4 to 8. FIG. 4 is a perspective view of an appearance of the imager. FIG. 5 is an exploded perspective view of the imager 20.

Figure 6:
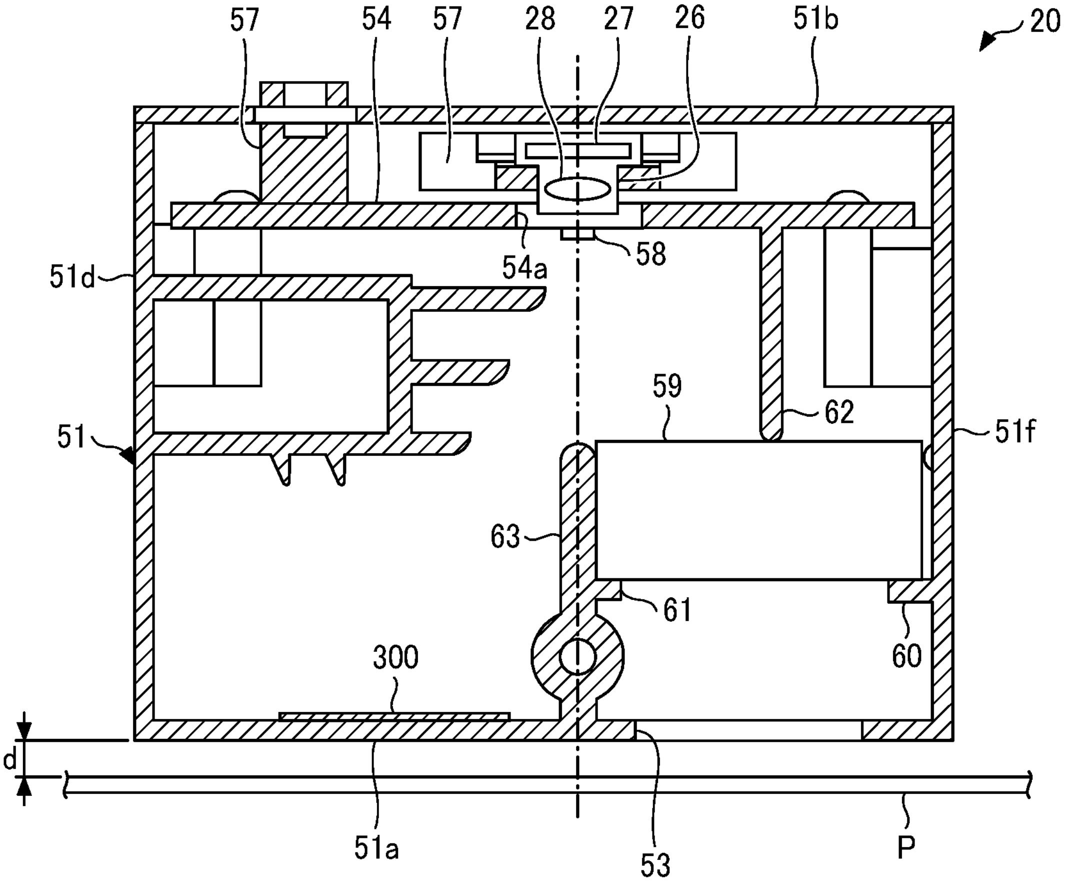
FIG. 6 is a longitudinal cross-sectional view of the imager as seen from an X1 direction in FIG. 4.
Figure 7:
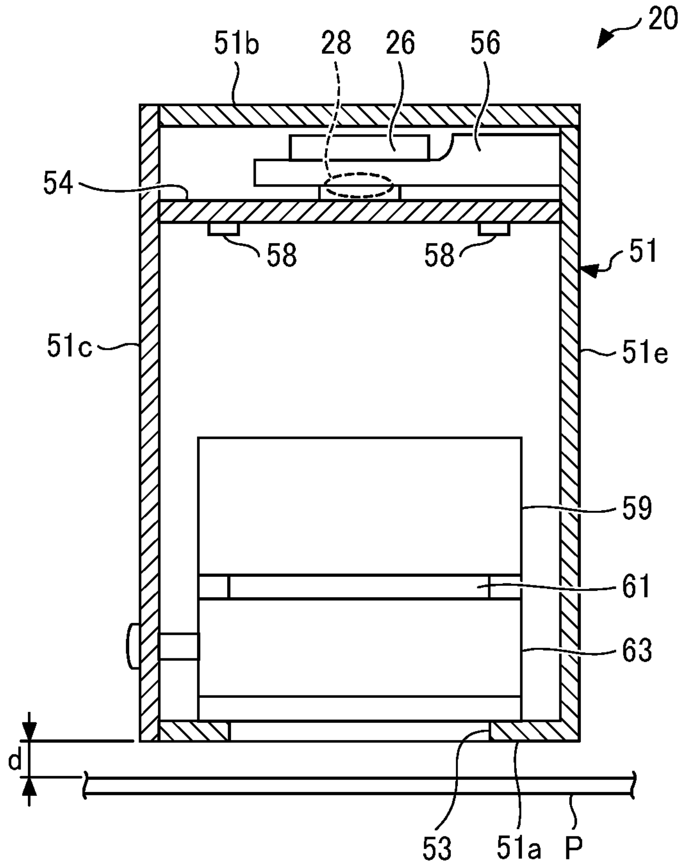
FIG. 7 is a longitudinal cross-sectional view of the imager seen from an X2 direction in FIG. 4.
Figure 8:
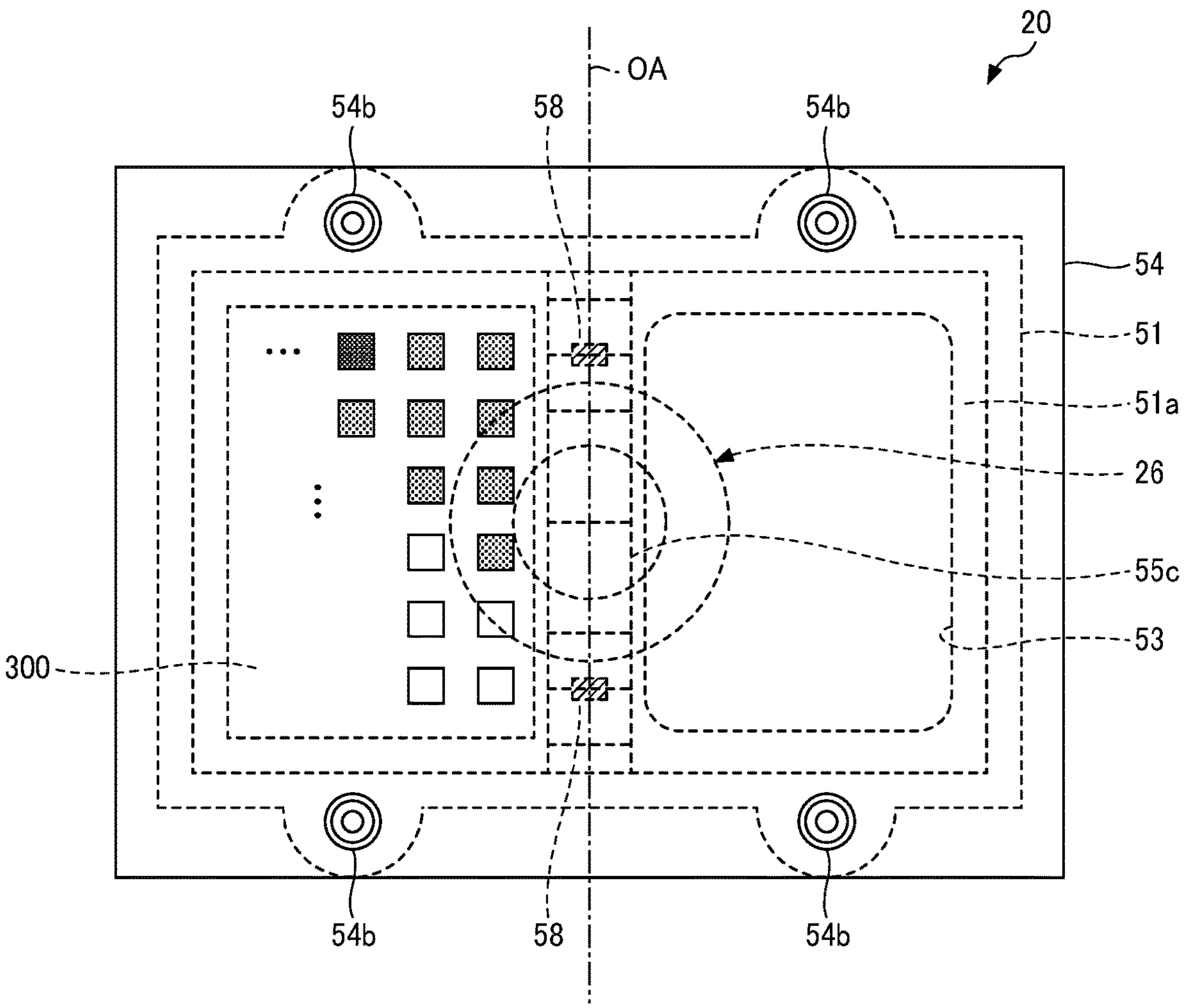
FIG. 8 is a plan view of an imager according to a first embodiment.

FIG. 6 is a longitudinal cross-sectional view of the imager 20 as seen from an X1 direction in FIG. 4. FIG. 7 is a longitudinal cross-sectional view of the imager 20 as seen from an X2 direction in FIG. 4. FIG. 8 is a plan view of the imager 20.

The imager 20 includes a housing 51 formed in a rectangular box shape, for example. The housing 51 includes, for example, a bottom plate 51*a* and a top plate 51*b* facing each other with a predetermined spacing left therebetween, and side wall portions 51*c*, 51*d*, 51*e*, and 51*f* connecting the bottom plate 51*a* and the top plate 51*b*.

The bottom plate 51*a* and the side wall portions 51*d*, 51*e*, and 51*f* of the housing 51 are integrally formed by molding, for example, whereas the top plate 51*b* and the side wall portion 51*c* are detachable from the housing 51. FIG. 5 illustrates a state in which the top plate 51*b* and the side wall portion 51*c* are removed.

The image forming apparatus 100 includes the imager 20 on a conveyance path of the recording medium P with the test pattern TP formed thereon, for example, in a state where the housing 51 is partially supported by a predetermined supporting member. As illustrated in FIGS. 6 and 7, the image forming apparatus 100 supports the imager 20 by a predetermined supporting member such that the bottom plate 51*a* of the housing 51 faces the conveyed recording medium P in a substantially parallel state with a gap d interposed therebetween.

The imager 20 has an opening 53 for enabling the test pattern TP outside the housing 51 to be imaged from the inside of the housing 51, on the bottom plate 51*a* of the housing 51 facing the recording medium P with the test pattern TP formed thereon. The imager 20 also has a reference chart 300 on the inner surface side of the bottom plate 51*a* of the housing 51, so as to be adjacent to the opening 53 via a support member 63. The reference chart 300 is captured together with the test pattern TP by a sensor unit 26 at the time of colorimetry of the test pattern TP and acquisition of RGB values.

The imager 20 also includes a circuit board 54 on the top plate 51*b* inside the housing 51. As illustrated in FIG. 8, the circuit board 54 includes a square box-shaped housing 51 that is fixed by fastening members 54*b* and is opened on the circuit board 54 side. The housing 51 is not limited to a rectangular box shape, and may have a cylindrical box shape or an elliptical cylindrical box shape that has the bottom plate 51*a* with the opening 53, for example.

The imager 20 also includes the sensor unit 26 that captures an image between the top plate 51*b* of the housing 51 and the circuit board 54. As illustrated in FIG. 6, the sensor unit 26 includes a two-dimensional sensor 27 such as a charge coupled device (CCD) sensor or a complementary metal oxide semiconductor (CMOS) sensor, and an imaging forming lens 28 that forms an optical image in an imaging range of the sensor unit 26 on a light receiving surface (imaging region) of the two-dimensional sensor 27. The two-dimensional sensor 27 is a light receiving element array in which light receiving elements that receive reflected light from a subject are two-dimensionally aligned.

The imager 20 holds the sensor unit 26 by a sensor holder 56 formed integrally with the side wall 51*e* of the housing 51, for example. The sensor holder 56 is provided with a ring 56*a* at a position facing a through hole 54*a* formed in the circuit board 54. The ring 56*a* has a through hole of a size corresponding to the outer shape of the protruding portion of the sensor unit 26 on the imaging forming lens 28 side.

The imager 20 holds the sensor unit 26 by the sensor holder 56 by inserting the protruding portion of the sensor unit 26 on the imaging forming lens 28 side into the ring 56*a* of the sensor holder 56 such that the imaging forming lens 28 faces the bottom plate 51*a* of the housing 51 via the through hole 54*a* of the circuit board 54.

The imager 20 holds the sensor unit 26 in a state of being positioned by the sensor holder 56 such that an optical axis indicated by an alternate long and short dash line in FIG. 6 is substantially perpendicular to the bottom plate 51*a* of the housing 51 and the opening 53 and the reference chart 300 to be described later are included in an imaging range. Accordingly, the sensor unit 26 can image the test pattern TP outside the housing 51 through the opening 53 in a part of the imaging region of the two-dimensional sensor 27. In addition, the sensor unit 26 can image the reference chart 300 arranged inside the housing 51 in another part of the imaging region of the two-dimensional sensor 27.

The sensor unit 26 is electrically connected to the circuit board 54 on which various electronic components are mounted via a flexible cable, for example. In addition, the circuit board 54 includes an external connection connector 57 to which a connection cable for connecting the imager 20 to the main control board of the image forming apparatus 100 is attached.

The imager 20 includes a pair of light sources 58 on the circuit board 54 at positions equally spaced apart from the center of the sensor unit 26 by a predetermined amount in the sub-scanning direction on a center line OA in the sub-scanning direction passing through the center of the sensor unit 26. The light sources 58 substantially uniformly illuminate the imaging range at the time of imaging by the sensor unit 26. The light sources 58 are suitably light emitting diodes (LEDs) or the like, which are space-saving and advantageous for power saving, for example.

As illustrated in FIGS. 7 and 8, the imager 20 includes, as the light source 58, a pair of LEDs evenly arranged in a direction orthogonal to the direction in which the opening 53 and the reference chart 300 are arranged with reference to the center of the imaging forming lens 28.

The two LEDs used as the light sources 58 are mounted on the bottom plate 51*a* side surface of the circuit board 54, for example. However, the light sources 58 are to be arranged at positions where the imaging range of the sensor unit 26 can be substantially uniformly illuminated by diffused light, and may not necessarily be directly mounted on the circuit board 54. The two LEDs are arranged at symmetrical positions about the two-dimensional sensor 27, so that the imaging surface can be imaged under the same illumination condition as the reference chart 300 side.

In the present embodiment, the LEDs are exemplified as the light sources 58, but the type of the light sources 58 is not limited to the LEDs. For example, the light sources 58 may be organic electroluminescent (EL) light sources or the like. In a case where the EL light sources are used as the light sources 58, illumination light close to the spectral distribution of sunlight can be obtained, so that improvement in colorimetric accuracy can be expected.

As illustrated in FIG. 8, the sensor unit 26 includes a light absorber 55*c* immediately below the light sources 58 and the two-dimensional sensor 27. The light absorber 55*c* reflects or absorbs the light from the light sources 58 in a direction other than the direction to the two-dimensional sensor 27. The light absorber 55*c* has an acute shape and is structured such that incident light from the light sources 58 is reflected on the inner surface of the light absorber 55*c* and is not reflected in the incident direction.

In the housing 51, an optical path length changing member 59 is provided in an optical path between the sensor unit 26 and the test pattern TP outside the housing 51 imaged by the sensor unit 26 through the opening 53.

The optical path length changing member 59 is an optical element with a refractive index n that has a sufficient transmittance of the light from the light source 58. The optical path length changing member 59 has a function of bringing the imaging forming plane of the optical image of the test pattern TP outside the housing 51 close to the imaging forming plane of the optical image of the reference chart 300 inside the housing 51.

The imager 20 changes the optical path length by arranging the optical path length changing member 59 in the optical path between the sensor unit 26 and the subject outside the housing 51. As a result, the imager 20 adjusts both the imaging forming surface of the optical image of the test pattern TP outside the housing 51 and the imaging forming surface of the reference chart 300 inside the housing 51 to the light receiving surface of the two-dimensional sensor 27 of the sensor unit 26. Therefore, the sensor unit 26 can capture an image focused on both the test pattern TP outside the housing 51 and the reference chart 300 inside the housing 51.

As illustrated in FIG. 6, the optical path length changing member 59 has the both end portions of the surface on the bottom plate 51*a* side supported by the pair of ribs 60 and 61. A pressing member 62 is arranged between the surface of the optical path length changing member 59 on the top plate 51*b* side and the circuit board 54, so that the optical path length changing member 59 does not move inside the housing 51. The optical path length changing member 59 is arranged so as to close the opening 53 in the bottom plate 51*a* of the housing 51. Therefore, the optical path length changing member 59 also has a function of preventing impurities such as ink mist and dust having intruded into the housing 51 from the outside of the housing 51 through the opening 53 from adhering to the sensor unit 26, the light sources 58, the reference chart 300, and the like.

The mechanical configuration of the imager 20 described above is merely an example, and is not limited thereto. The imager 20 is configured to image the test pattern TP outside the housing 51 through the opening 53 by the sensor unit 26 inside the housing 51 at least while the light sources 58 inside the housing 51 are turned on. The imager 20 can be variously modified or changed in the above configuration.

For example, the imager 20 according to the present embodiment includes the reference chart 300 on the inner side of the bottom plate 51*a* of the housing 51. However, an opening different from the opening 53 may be provided at the position where the reference chart 300 is arranged on the bottom plate 51*a* of the housing 51, and the reference chart 300 may be attached to the position where the opening is provided from the outside of the housing 51. In this case, the sensor unit 26 images the test pattern TP on the recording medium P through the opening 53, and captures an image of the reference chart 300 attached to the bottom plate 51*a* of the housing 51 from the outside through an opening different from the opening 53. In this example, there is an advantage that if the reference chart 300 has a defect such as contamination, the reference chart 300 can be easily replaced.

Configuration Example of Reference Chart

Figure 9:
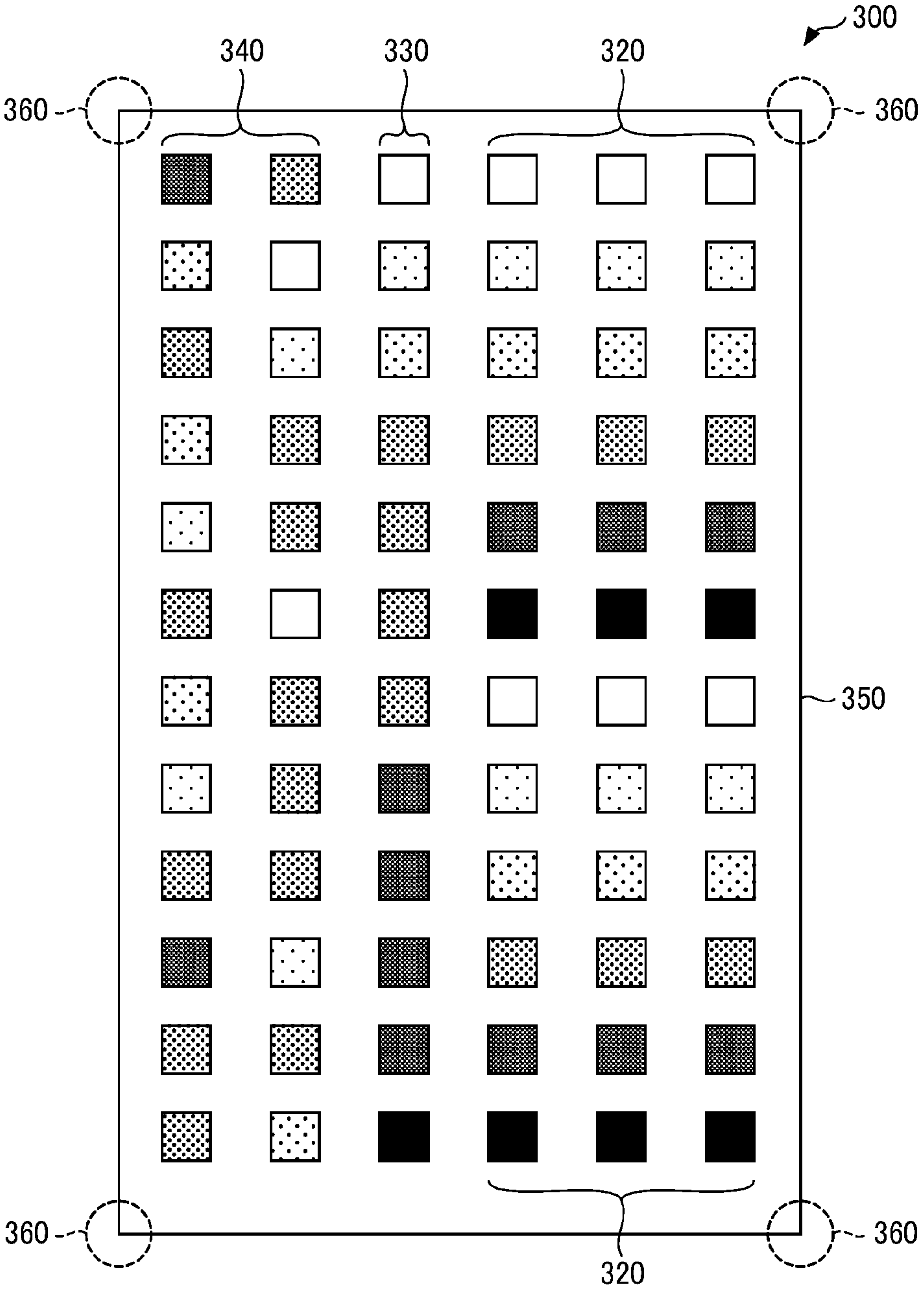
FIG. 9 is a diagram illustrating a reference chart.

A specific example of the reference chart 300 arranged in the housing 51 of the imager 20 will be described with reference to FIG. 9. FIG. 9 is a diagram illustrating the specific example of the reference chart.

The reference chart 300 illustrated in FIG. 9 includes a plurality of colorimetric patch rows 320 to 340 in which colorimetric patches for colorimetry are arranged, distance measurement lines 350, and chart position specifying markers 360.

The colorimetric patch rows 320 to 340 include a colorimetric patch row 320 in which colorimetric patches of primary colors of YMCK are arranged in gradation order, colorimetric patch rows 320 in which colorimetric patches of secondary colors of RGB are arranged in gradation order, a colorimetric patch row (achromatic gradation pattern) 330 in which colorimetric patches of grayscale are arranged in gradation order, and colorimetric patch rows 340 in which colorimetric patches of tertiary colors are arranged.

The distance measurement lines 350 constitute a substantially rectangular frame formed so as to surround the plurality of colorimetric patch rows 320 to 340. The chart position specifying markers 360 are provided at four corners of the distance measurement lines 350, and function as markers for specifying the positions of the colorimetric patches. The position of the reference chart 300 and the position of each colorimetric patch can be determined by specifying the distance measurement lines 350 and the chart position specifying markers 360 at the four corners thereof from the image of the reference chart 300 captured by the sensor unit 26.

The colorimetric patches constituting the colorimetric patch rows 320 to 340 for colorimetry have a function as a reference of a hue reflecting the imaging conditions of the sensor unit 26. The configuration of the colorimetric patch rows 320 to 340 for colorimetry arranged in the reference chart 300 is not limited to the example illustrated in FIG. 9, and any colorimetric patch rows can be applied. For example, the image forming apparatus 100 may use colorimetric patches by which as a wide color range as possible can be specified, and the colorimetric patch row 320 of the primary colors of YMCK and the colorimetric patch row 330 of grayscale may be formed from patches of colorimetric values of colorants used in the image forming apparatus 100. The colorimetric patch row 320 of the secondary colors of RGB may be formed from patches of colorimetric values that can be developed by the colorants used in the image forming apparatus 100, and may be formed from a reference color chart in which colorimetric values such as Japan Color are defined.

In the present embodiment, the reference chart 300 having the colorimetric patch rows 320 to 340 in the form of a general patch (color chart) is used. However, the reference chart 300 may not necessarily have the colorimetric patch rows 320 to 340. The reference chart 300 may merely have a configuration in which a plurality of colors available for colorimetry is arranged so that respective positions thereof can be specified.

Since the reference chart 300 is arranged on the inner side of the bottom plate 51*a* of the housing 51 so as to be adjacent to the opening 53, the sensor unit 26 can capture an image of the reference chart 300 in parallel with the test pattern TP outside the housing 51. The parallel imaging here means that image data of one frame including the test pattern TP outside the housing 51 and the reference chart 300 is acquired. That is, even if there is a time difference in data acquisition for each pixel, acquiring image data in which the test pattern TP outside the housing 51 and the reference chart 300 are included in one frame means that the test pattern TP outside the housing 51 and the reference chart 300 are imaged in parallel.

Second Example of Imager

Figure 10:
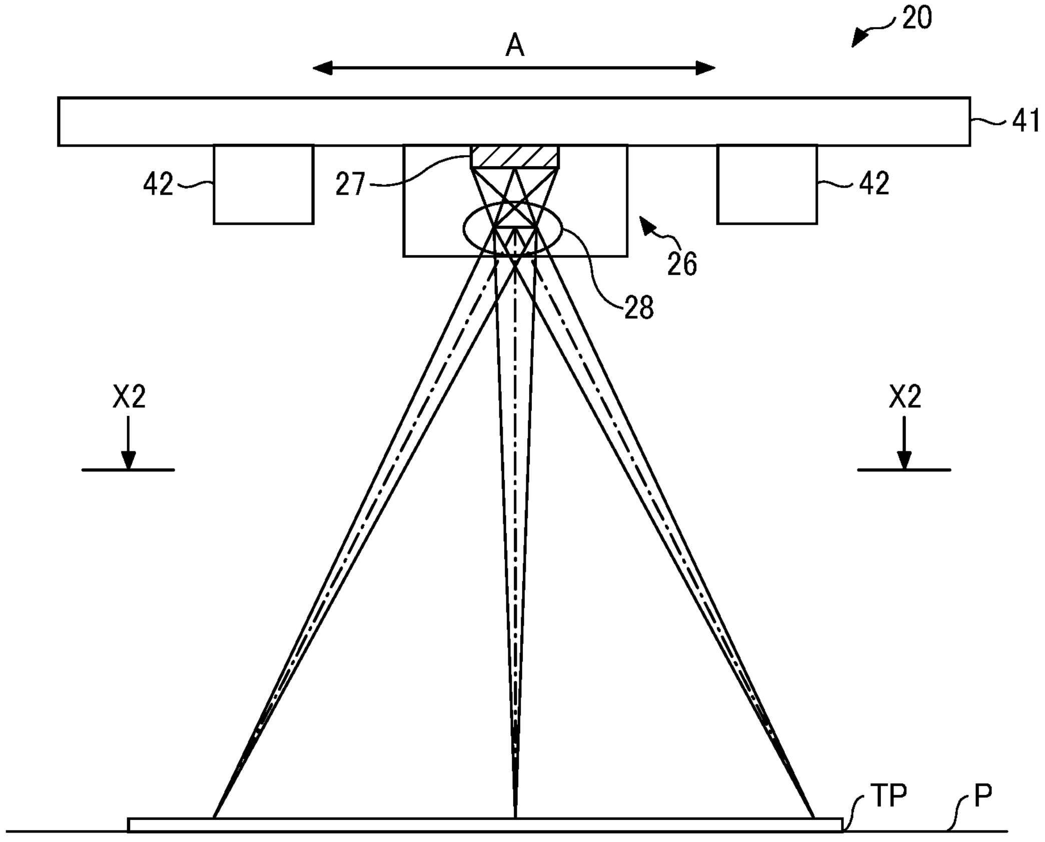
FIG. 10 is a longitudinal cross-sectional view 10 of the imager that does not include the reference chart.
Figure 11:
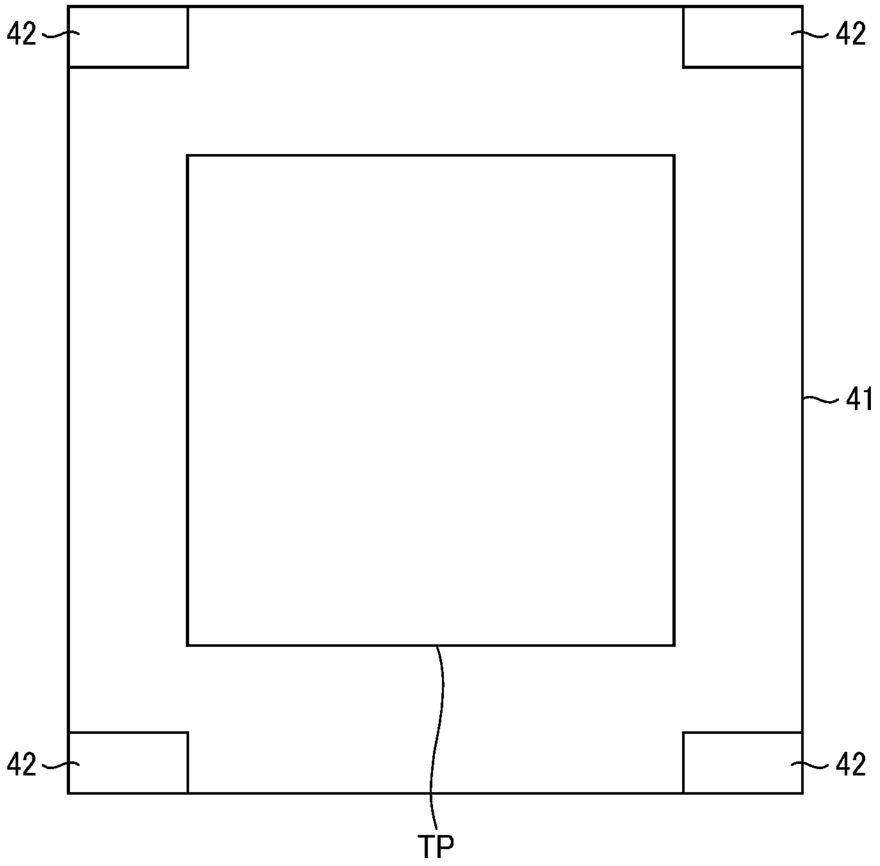
FIG. 11 is a plan view of the imager in FIG. 10 as 11 seen from the X2 direction.

A specific example of the imager 20 having no reference chart will be described as a second example of the imager 20 with reference to FIGS. 10 and 11. FIG. 10 is a longitudinal cross-sectional view of the imager. FIG. 11 is a plan view of the imager of FIG. 10 as seen from the X2 direction.

As illustrated in FIG. 10, the imager 20 includes light sources 42 and the sensor unit 26 on a substrate 41 fixed to the carriage 5.

The light sources 42 includes an LED, for example, and irradiates the test pattern TP on the recording medium P as a subject with illumination light. Reflection light (diffused reflection light or regular reflection light) from the test pattern TP is incident on the sensor unit 26. As illustrated in FIG. 11, four light sources 42 are arranged so as to surround the test pattern TP on the recording medium P, and irradiate the test pattern TP with uniform illumination light.

The sensor unit 26 includes the two-dimensional sensor 27 such as a CCD sensor or a CMOS sensor, and the imaging forming lens 28. The sensor unit 26 causes reflection light of the illumination light emitted from the light source 42 to the test pattern TP to be incident on the two-dimensional sensor 27 through the imaging forming lens 28. The two-dimensional sensor 27 converts the incident light into an analog signal by photoelectric conversion and outputs the analog signal as a captured image of the test pattern TP.

Configuration Example Around Conveyance Roller

Figure 12:
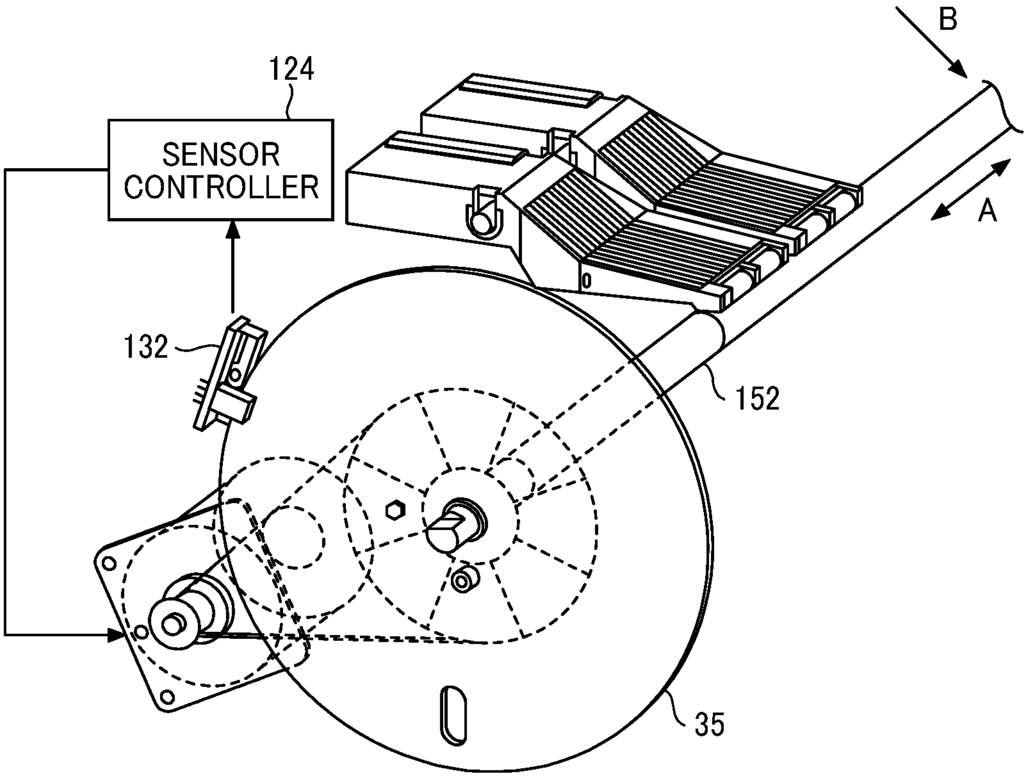
FIG. 12 is a diagram illustrating an example of a configuration around a conveyance roller and its surroundings.

A configuration for conveying the recording medium P which is an object to be conveyed will be described. FIG. 12 is a diagram illustrating an example of a configuration around the conveyance roller 152. As illustrated in FIG. 12, the recording medium P is intermittently conveyed in the sub-scanning direction (the direction of arrow B in the drawing) orthogonal to the main scanning direction (the direction of arrow A in the drawing) which is the moving direction of the carriage 5. At this time, an encoder 35 provided coaxially with the conveyance roller 152 is read by a sub-scanning encoder sensor 132 provided on an unillustrated side plate.

The conveyance amount of the recording medium P is controlled by the sensor controller 124 (see FIG. 13) electrically connected to the sub-scanning encoder sensor 132 on the basis of the information read in this manner. In this example, the encoder 35 is configured as a rotary encoder, and the optical grating is arranged in a disk shape and is configured to detect an angle, a rotation amount, a rotation speed, and the like.

Hardware Configuration Example of Image Forming Apparatus

Figure 13:
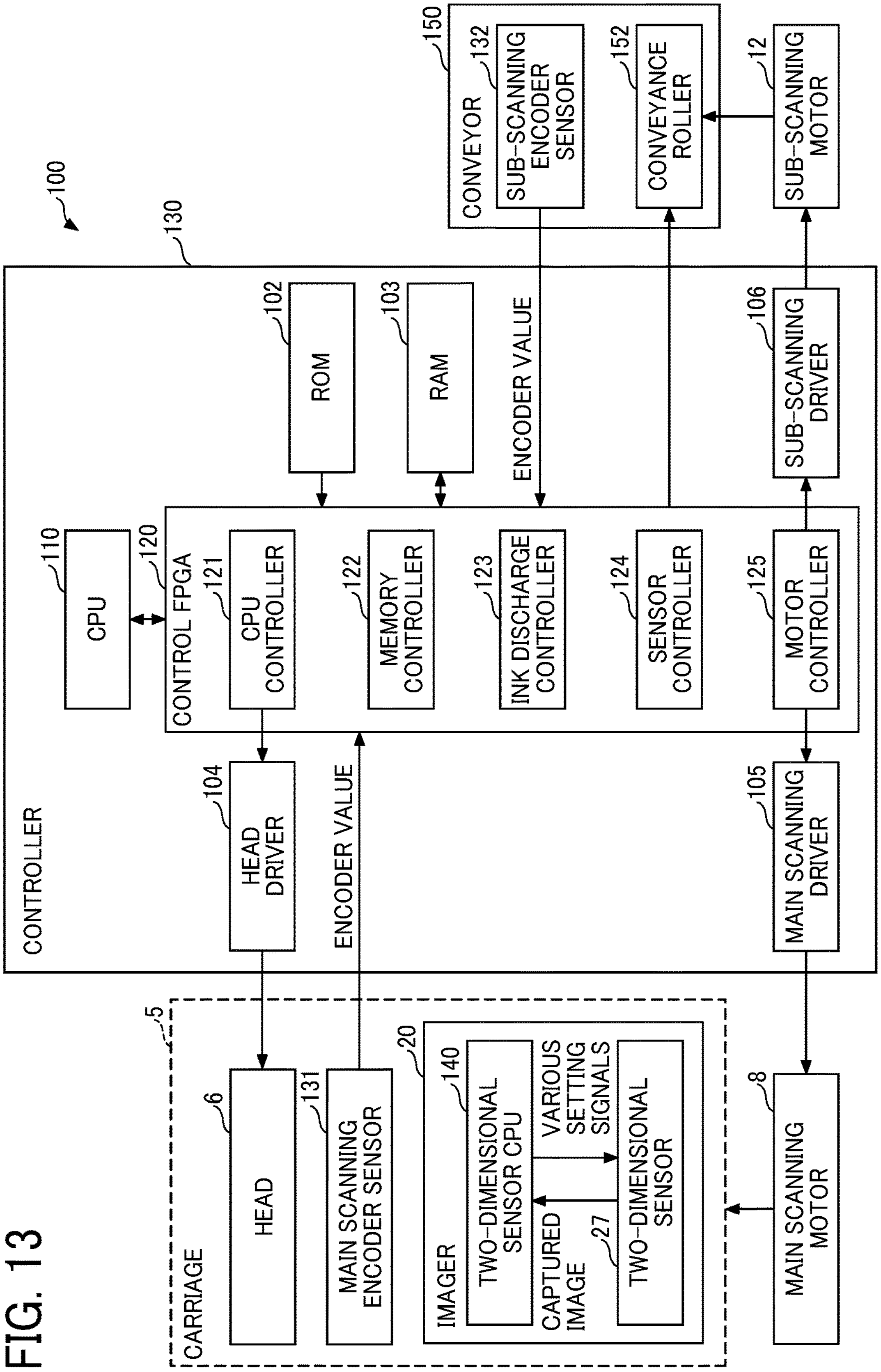
FIG. 13 is a diagram illustrating a hardware configuration example of the image forming apparatus according to the embodiment.

Next, a hardware configuration of the image forming apparatus 100 according to the present embodiment will be described with reference to FIG. 13. FIG. 13 is a hardware configuration diagram of the image forming apparatus according to the first embodiment.

As illustrated in FIG. 13, the image forming apparatus 100 includes a controller 130, the head 6, a main scanning encoder sensor 131, an imager 20, the main scanning motor 8, a conveyor 150, and the sub-scanning motor 12.

The controller 130 includes a central processing unit (CPU) 110, a read only memory (ROM) 102, a random access memory (RAM) 103, a head driver 104, a main scanning driver 105, a sub-scanning driver 106, and a control field-programmable gate array (FPGA) 120.

The controller 130 is mounted on the main control board. The head 6, the main scanning encoder sensor 131, and the imager 20 are mounted on the carriage 5. The sub-scanning encoder sensor 132 and the conveyance roller 152 are mounted on the conveyor 150.

The controller 130 controls the relative movement of the recording medium P and the head 6 along the main scanning direction, the relative movement of the recording medium P and the head 6 by a predetermined conveyance amount along the sub-scanning direction, and the discharge of the color ink and the base ink by the head 6.

In particular, in the present embodiment, the controller 130 performs control to form a first test pattern on the recording medium P with the color ink discharged from the first nozzle, form a second test pattern on the recording medium P with the color ink discharged from the third nozzle, and form a mask image so as to overlap on or under the first test pattern and the second test pattern with the base ink discharged from the second nozzle.

The CPU 110 controls the entire image forming apparatus 100. For example, the CPU 110 uses the RAM 103 as a work area, executes various control programs stored in the ROM 102, and outputs control commands for controlling various operations in the image forming apparatus 100.

In the present embodiment, the image forming apparatus 100 implements, by the CPU 110, a function of forming the test pattern TP, a function of a distance measuring device, a function of adjusting parameters related to the conveyance amount of the recording medium P on the basis of the distance, and the like. The test pattern TP formed by the image forming apparatus 100 includes the first test pattern, the second test pattern, and the mask image.

The head driver 104, the main scanning driver 105, and the sub-scanning driver 106 are drivers for driving the head 6, the main scanning motor 8, and the sub-scanning motor 12, respectively.

The control FPGA 120 controls various operations in the image forming apparatus 100 in cooperation with the CPU 110. The control FPGA 120 includes, for example, a CPU controller 121, a memory controller 122, an ink discharge controller 123, the sensor controller 124, and a motor controller 125 as functional components.

The CPU controller 121 communicates with the CPU 110 to transmit various types of information acquired by the control FPGA 120 to the CPU 110, and inputs a control command output from the CPU 110.

The memory controller 122 performs memory control for the CPU 110 to access the ROM 102 and the RAM 103.

The ink discharge controller 123 controls the operation of the head driver 104 in accordance with a control command from the CPU 110 to control the discharge timing of ink from the head 6 driven by the head driver 104.

The sensor controller 124 performs processing on sensor signals such as encoder values output from the main scanning encoder sensor 131 and the sub-scanning encoder sensor 132. For example, the sensor controller 124 executes processing of calculating the position, moving speed, moving direction, and the like of the carriage 5 on the basis of the encoder value output from the main scanning encoder sensor 131. Furthermore, for example, the sensor controller 124 executes processing of calculating the rotation speed, rotation direction, and the like of the conveyance roller 152 that conveys the recording medium P on the basis of the encoder value output from the sub-scanning encoder sensor 132.

The motor controller 125 controls the operation of the main scanning driver 105 in accordance with a control command from the CPU 110, thereby controlling the main scanning motor 8 driven by the main scanning driver 105 to control the movement of the carriage 5 in the main scanning direction. The motor controller 125 also controls the operation of the sub-scanning driver 106 in accordance with a control command from the CPU 110, thereby controlling the sub-scanning motor 12 driven by the sub-scanning driver 106 to control the movement (conveyance) of the recording medium P in the sub-scanning direction by the conveyance roller 152.

The above devices are mere examples of control functions implemented by the control FPGA 120, and various other control functions may be implemented by the control FPGA 120.

All or some of the above-described control functions may be implemented by programs executed by the CPU 110 or another general-purpose CPU. Some of the above-described control functions may be implemented by dedicated hardware such as another FPGA different from the control FPGA 120 or an application specific integrated circuit (ASIC).

The head 6 has a plurality of nozzles that discharges ink to form an image (see FIG. 3), is driven by the head driver 104 whose operation is controlled by the CPU 110 and the control FPGA 120, and discharges ink onto the recording medium P on the platen 16 to form an image.

The main scanning encoder sensor 131 outputs an encoder value obtained by detecting the marks of the encoder sheet 14 to the control FPGA 120. The encoder value is used by the sensor controller 124 of the control FPGA 120 to calculate the position, moving speed, and moving direction of the carriage 5. The position, moving speed, and moving direction of the carriage 5 calculated from the encoder value by the sensor controller 124 are sent to the CPU 110. The CPU 110 generates a control command for controlling the main scanning motor 8 based on the position, moving speed, and moving direction of the carriage 5, and outputs the control command to the motor controller 125.

The imager 20 captures an image of the test pattern TP on the recording medium P under the control of the CPU 110 and performs various processes on the captured image, and includes a two-dimensional sensor CPU 140 and a two-dimensional sensor 27.

The two-dimensional sensor 27 is a CCD sensor, a CMOS sensor, or the like, and captures an image of the test pattern TP and the frame line F under predetermined operation conditions based on various setting signals sent from the two-dimensional sensor CPU 140. Then, the two-dimensional sensor 27 transmits the captured image to the two-dimensional sensor CPU 140.

The two-dimensional sensor CPU 140 controls the two-dimensional sensor 27 and performs processing on an image captured by the two-dimensional sensor 27. Specifically, the two-dimensional sensor CPU 140 sends various setting signals to the imager 20 to set various operation conditions of the two-dimensional sensor 27. The two-dimensional sensor CPU 140 also implements a function of detecting the markers of the test pattern TP from the captured image of the test pattern TP and a function of calculating the ratio between the distance in the captured image and the actual distance.

The imager 20 includes a RAM and a ROM, and the two-dimensional sensor CPU 140 uses the RAM as a work area, for example, to execute various control programs stored in the ROM, and outputs control commands for controlling various operations of the imager 20. The two-dimensional sensor CPU 140 has a function of performing AD conversion of an analog signal obtained through photoelectric conversion by the two-dimensional sensor 27 into digital image data and performing various types of image processing such as shading correction, white balance correction, y correction, and format conversion of image data on the image data. Some or all of various types of image processing on the captured image may be performed outside the imager 20.

The sub-scanning encoder sensor 132 outputs an encoder value obtained by reading the encoder 35 to the control FPGA 120. The encoder value is used by the sensor controller 124 of the control FPGA 120 to calculate the rotation speed and rotation direction of the conveyance roller 152 that conveys the recording medium P. The rotation speed and rotation direction of the conveyance roller 152 calculated from the encoder value by the sensor controller 124 are sent to the CPU 110. The CPU 110 generates a control command for controlling the sub-scanning motor 12 based on the rotation speed and rotation direction of the conveyance roller 152, and outputs the control command to the motor controller 125.

The conveyance roller 152 rotates at the rotation speed and in the rotation direction based on the control command received from the motor controller 125 to convey the recording medium P by a predetermined conveyance amount.

In the image forming apparatus 100 of the present embodiment, the head driver 104, the main scanning driver 105, and the sub-scanning driver 106 controlled by the CPU 110 and the control FPGA 120 described above, and the head 6, the main scanning motor 8, and the sub-scanning motor 12 driven by these components constitute an image former that forms an image on the recording medium P.

In FIG. 13, the two-dimensional sensor CPU 140 and the imager 20 are mounted on the carriage 5. However, the two-dimensional sensor CPU 140 and the imager 20 may be arranged so as to appropriately capture an image of the test pattern TP on the recording medium P, without being mounted on the carriage 5.

Functional Configuration Example of CPU

Figure 14:
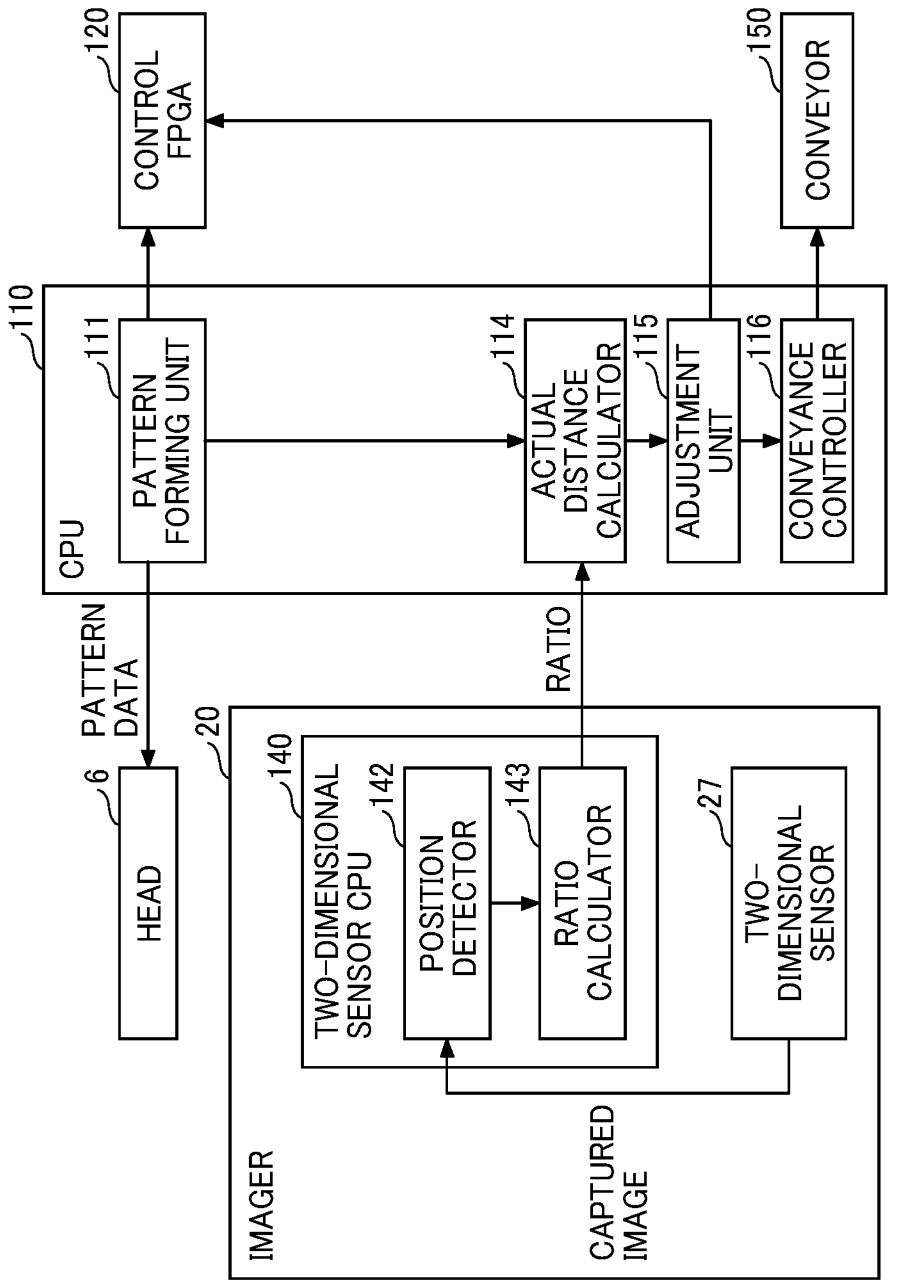
FIG. 14 is a diagram of an exemplary functional configuration of a central processing unit (CPU) according to the embodiment.

Functions implemented mainly by the CPU 110 of the controller 130 will be described with reference to FIG. 14. FIG. 14 is a block diagram illustrating an example of a functional configuration of the CPU 110.

The CPU 110 includes a pattern forming unit 111, an actual distance calculator 114, an adjustment unit 115, and a conveyance controller 116. For example, the CPU 110 uses the RAM 103 as a work area to execute control programs stored in the ROM 102, thereby implementing functions of the pattern forming unit 111, the actual distance calculator 114, the adjustment unit 115, the conveyance controller 116, and the like.

In the present embodiment, these functions are implemented by the CPU 110 as an example. However, at least some of these functions may be implemented by components other than the CPU 110, such as the control FPGA 120 or the imager 20. Alternatively, the CPU 110 and components other than the CPU 110 may implement at least some of the above functions in a distributed manner.

The two-dimensional sensor CPU 140 of the imager 20 implements functions of the position detector 142, the ratio calculator 143, and the like by implementing control programs stored in the ROM using the RAM as a work area, for example.

The conveyance controller 116 controls the conveyance roller 152 of the conveyor 150 that conveys the recording medium P. For example, the conveyance controller 116 determines the rotation speed, rotation direction, and the like of the conveyance roller 152 on the basis of the encoder value output from the sub-scanning encoder sensor 132, and sends a control command indicating the rotation speed and the rotation direction to the conveyance roller 152 of the conveyor 150 via the control FPGA 120, thereby controlling the conveyance of the recording medium P by the conveyance roller 152.

The pattern forming unit 111 reads pattern data stored in advance in the ROM 102 or the like, for example, and causes the image forming unit to perform an image forming operation according to the pattern data, thereby forming the test pattern TP on the recording medium P. The imager 20 captures an image of the test pattern TP formed on the recording medium P by the pattern forming unit 111.

The pattern forming unit 111 forms either a first marker M1 or a pair of second markers M2*a* and M2*b* on the recording medium P using the image forming unit. After the recording medium P is conveyed by a predetermined conveyance amount, the pattern forming unit 111 forms a mask image M3 with white ink on the previously formed image. The first marker M1, the pair of second markers M2*a* and M2*b*, and the mask image M3 are constituent parts included in the test pattern TP.

After forming the mask image M3 with white ink and the recording medium P is conveyed again by a predetermined conveyance amount, the pattern forming unit 111 forms the other of the first marker M1 and the pair of second markers M2*a* and M2*b* having not been formed before the conveyance.

In relation to the present embodiment, an example will be described in which the pattern forming unit 111 forms the first marker M1 on the recording medium P, forms the mask image M3 with white ink on the first marker M1 after the recording medium P is conveyed by a predetermined conveyance amount, and forms the pair of second markers M2*a* and M2*b* after the recording medium P is conveyed again by a predetermined conveyance amount.

Either the first marker M1 and the pair of second markers M2*a* and M2*b* may be formed first. The pattern forming unit 111 may form the pair of second markers M2*a* and M2*b* on the recording medium P, form the mask image M3 with white ink, and then form the first marker M1 after the recording medium P is conveyed by a predetermined conveyance amount.

Example of Test Pattern

Figure 15:
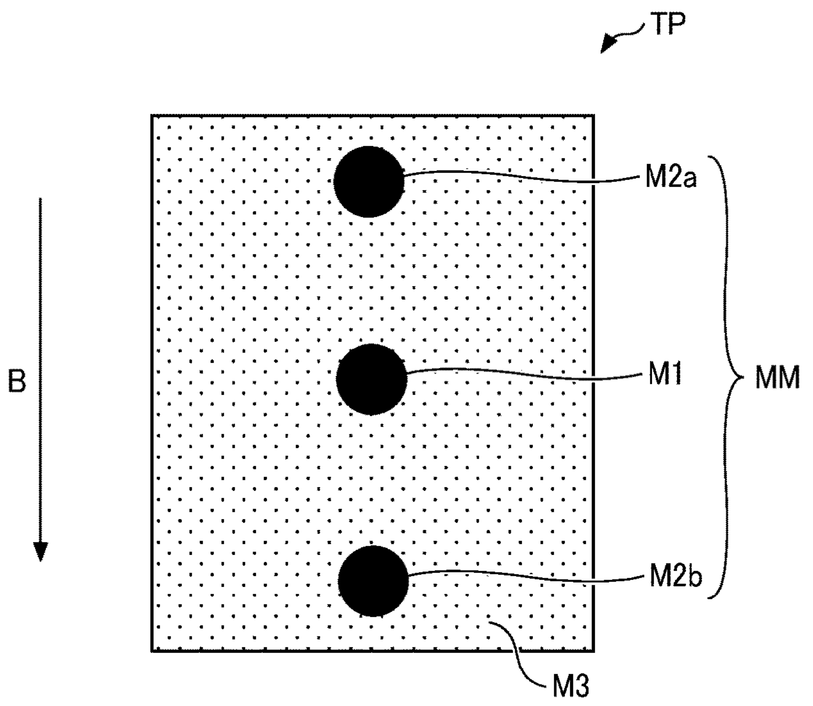
FIG. 15 is a diagram illustrating a test pattern formed on a recording medium.

The test pattern TP will be described with reference to FIG. 15. FIG. 15 is a diagram illustrating an example of the test pattern TP formed on the recording medium P.

As illustrated in FIG. 15, the test pattern TP includes a set MM of markers including at least the first marker M1 and the pair of second markers M2*a* and M2*b*, and the mask image M3 formed with white ink.

The test pattern TP illustrated in FIG. 15 includes the first marker M1 midway between the pair of second markers M2*a* and M2*b*. The first marker M1 and the pair of second markers M2*a* and M2*b* are formed by dots and are formed along the sub-scanning direction (arrow B direction in the drawing).

After the first marker M1 is formed, the mask image M3 is formed with white ink so as to be overlaid on the first marker M1. In other words, the mask image M3 is formed so as to overlap the first marker M1. The pair of second markers M2*a* and M2*b* is formed on the mask image M3 formed with white ink.

Method for Forming Test Pattern

A method of forming the test pattern TP will be described with reference to FIG. 16. FIGS. 16A to 16C are diagrams illustrating an example of a method of forming the test pattern TP. FIG. 16A is a diagram illustrating the first marker M1, FIG. 16B is a diagram illustrating the actual conveyance amount L1, and FIG. 16C is a diagram illustrating the second markers M2*a* and M2*b* formed on the mask image M3.

Figures 16A, 16B, 16C:
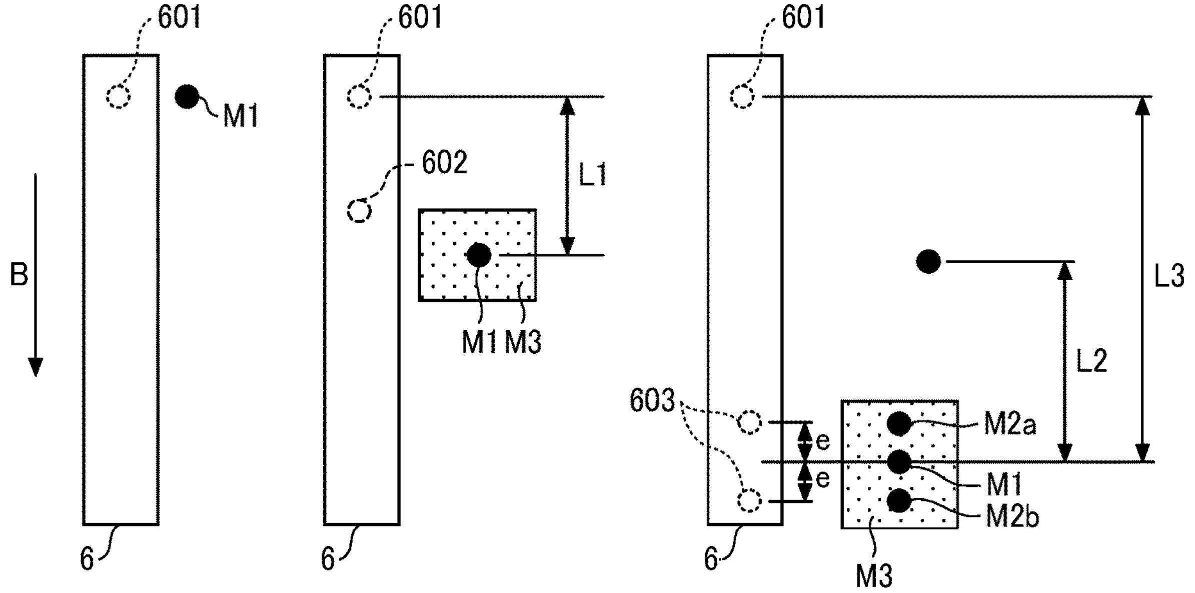
FIG. 16A is a diagram illustrating a method of forming a test pattern according to the embodiment.
FIG. 16B is a diagram illustrating the method of forming a test pattern according to the embodiment.
FIG. 16C is a diagram illustrating the method of forming a test pattern according to the embodiment.

As illustrated in FIGS. 16A to 16C, the head 6 includes a first nozzle 601, a second nozzle 602, and third nozzles 603. The first nozzle 601 discharges color ink. The second nozzle 602 discharges base ink. The third nozzles 603 are arranged at positions different from the first nozzle 601 in the sub-scanning direction, and discharge color ink. The head 6 includes the first nozzle 601, the second nozzle 602, and the third nozzles 603 in this order from the upstream side in the sub-scanning direction.

The first marker M1 is an example of a first test pattern formed on the recording medium P with the color ink discharged from the first nozzle 601. The second markers M2*a* and M2*b* are examples of a second test pattern formed on the recording medium P with the color ink discharged from the third nozzles 603. The mask image M3 is an example of a mask image that is formed with the base ink discharged from the second nozzle 602 so as to overlap on or under the first marker M1 and the second markers M2*a* and M2*b*.

As illustrated in FIG. 16A, the pattern forming unit 111 forms the first marker M1 on the recording medium P. Next, as illustrated in FIG. 16B, the conveyance controller 116 conveys the recording medium P in the sub-scanning direction (direction of arrow B in the drawing) by the actual conveyance amount L1 by the conveyance roller 152.

Then, the pattern forming unit 111 forms the mask image M3 with white ink so as to cover the first marker M1 from above, in other words, so as to overlap the mask image M3 on the first marker M1. Then, as illustrated in FIG. 16C, the pattern forming unit 111 forms the second markers M2*a* and M2*b* from above the mask image M3 formed with white ink after the conveyance by an actual conveyance amount L2.

The pair of second markers M2*a* and M2*b* is formed by the two third nozzles 603 (designated nozzles) separated from each other by a distance e on both front and back sides in the sub-scanning direction, with reference to a nozzle separated by an ideal conveyance amount L3 from the first nozzle 601 that has discharged the color ink to form the first marker M1. The ideal conveyance amount L3 is an example of a predetermined conveyance amount.

Hereinafter, the nozzle as a reference may be referred to as reference nozzle, and the two nozzles separated from the reference nozzle by the distance e back and forth in the sub-scanning direction may be referred to as designated nozzles. The number of the third nozzles 603 is not limited to two, and may be one.

When the actual conveyance amount L1+L2 and the ideal conveyance amount L3 are the same, the test pattern TP is formed in which the first marker M1 is formed at the ideal position that is the intermediate position in the sub-scanning direction of the pair of second markers M2*a* and M2*b*. On the other hand, when the actual conveyance amount L1+L2 and the ideal conveyance amount L3 are different, the test pattern TP is formed in which the first marker M1 is formed at a position close to any one of the markers even between the pair of second markers M2*a* and M2*b*, for example.

Then, photographing the test pattern TP and calculating the relative positional relationship between the first marker M1 and the pair of second markers M2*a* and M2*b* makes it possible to detect the shift between the ideal conveyance amount L3 and the actual conveyance amount L1+L2. In the present embodiment, the ideal position of the first marker M1 is the intermediate position between the pair of second markers M2*a* and M2*b*. However, the ideal position may not be the intermediate position between the pair of second markers M2*a* and M2*b*. That is, if the first marker M1 can be imaged together with the pair of second markers M2*a* and M2*b* and is formed at a predetermined position, the ideal position of the first marker M1 may be a position close to one of the pair of second markers M2*a* and M2*b* or may not be between the pair of second markers M2*a* and M2*b*.

The mask image M3 constituting the test pattern TP is formed with the base ink discharged from the second nozzle 602. If the recording medium P is transparent, when the test pattern TP is photographed, any through hole provided in the platen 16 at a position overlapping with the test pattern TP in the thickness direction or any ink stain occurring in the image forming operation may hinder the calculation of the relative positional relationship between the first marker M1 and the second markers M2*a* and M2*b*. The mask image M3 has a function of hiding through holes and stains and preventing hindrance of calculation.

Correction Processing Example of Conveyance Amount Based on Shift Calculation Result of Conveyance Amount The position detector 142 (see FIG. 14) of the two-dimensional sensor CPU 140 performs predetermined processing such as binarization processing on the image captured by the imager 20 to detect the first marker M1 and the pair of second markers M2*a* and M2*b* from the captured image.

The ratio calculator 143 of the two-dimensional sensor CPU 140 calculates the ratio between the distance between the pair of second markers M2*a* and M2*b* in the captured image and the amount of positional shift of the first marker M1 in the captured image based on the positions of the first marker M1 and the pair of second markers M2*a* and M2*b* in the captured image.

Figure 17:
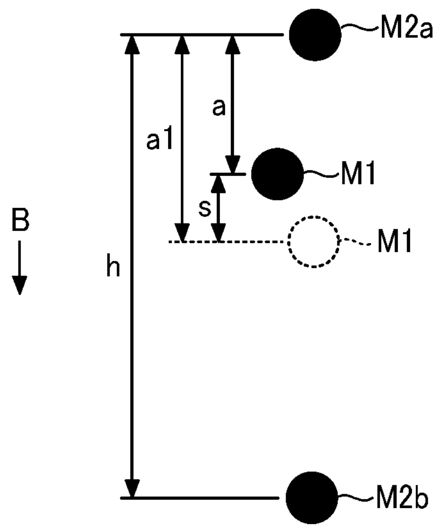
FIG. 17 is a diagram illustrating an example of a method of calculating the ratio between a distance between a pair of second markers and a positional shift amount of a first marker in a captured image.

A method of calculating the ratio will be specifically described with reference to FIG. 17. FIG. 17 is a diagram describing a method of calculating the ratio between the distance between the pair of second markers M2*a* and M2*b* and the amount of positional shift of the first marker M1 in a captured image.

As illustrated in FIG. 17, the ratio calculator 143 obtains a distance h between the pair of second markers M1*a* and M1*b* in the captured image, from the detected positions of the pair of second markers M2*a* and M2*b*. Then, a positional shift amount s of the first marker M1 in the captured image is obtained from the difference between the detected first marker M1 and the ideal position of the first marker M1.

The ideal position of the first marker M1 is a position corresponding to the middle between the pair of second markers M2*a* and M2*b* in the present embodiment, that is, a position at a distance of ½ of the distance between the pair of second markers M2*a* and M2*b* from the respective positions of the second marker M2*a* and the second marker M2*b*. In FIG. 17, the ideal position of the first marker M1 is a position (position at a distance al in FIG. 17) at the same distance h/2 from each of the positions of the second marker M2*a* and the second marker M2*b*.

Therefore, the positional shift amount s of the first marker M1 in the captured image is the difference between the distance al between the ideal positions of the second marker M2*a* and the first marker M1 and the distance a between the second marker M2*a* and the first marker M1. The positional shift amount s of the first marker M1 in the captured image is divided by the distance h between the pair of second markers M2*a* and M2*b* in the captured image (s/h), thereby calculating the ratio. The ratio calculated by the ratio calculator 143 is passed to the actual distance calculator 114.

The actual distance calculator 114 (see FIG. 14) of the CPU 110 calculates the actual distance of the positional shift amount of the first marker M1 based on the actual distance between the pair of second markers M2*a* and M2*b* and the ratio calculated by the ratio calculator 143. That is, the actual distance calculator 114 multiplies the actual distance between the pair of second markers M2*a* and M2*b* by the ratio (ratio s/h in FIG. 17) calculated by the ratio calculator 143 to calculate the actual distance of the positional shift amount s of the first marker M1 with respect to the pair of second markers M2*a* and M2*b*. The actual distance calculated by the actual distance calculator 114 is passed to the adjustment unit 115.

The adjustment unit 115 of the CPU 110 calculates correction amounts of parameters related to the conveyance amount of the recording medium P by the conveyance controller 116 for each scanning direction of the carriage 5 based on the positional shift amount s of the first marker M1 calculated by the actual distance calculator 114, and adjusts the actual distance by the calculated correction amounts. The parameters related to the conveyance amount of the recording medium P are parameters for controlling a rotation speed for rotating the conveyance roller 152, for example. The adjustment unit 115 transmits the adjustment values of these parameters to the control FPGA 120 to adjust the control operation of the conveyance roller 152 by the conveyance controller 116 or the like. Accordingly, even when the inclination of the head 6A is different between the forward path and the backward path of the head 6A, the accuracy of the ink landing position can be improved.

Operation Example of Image Forming Apparatus

Figure 18:
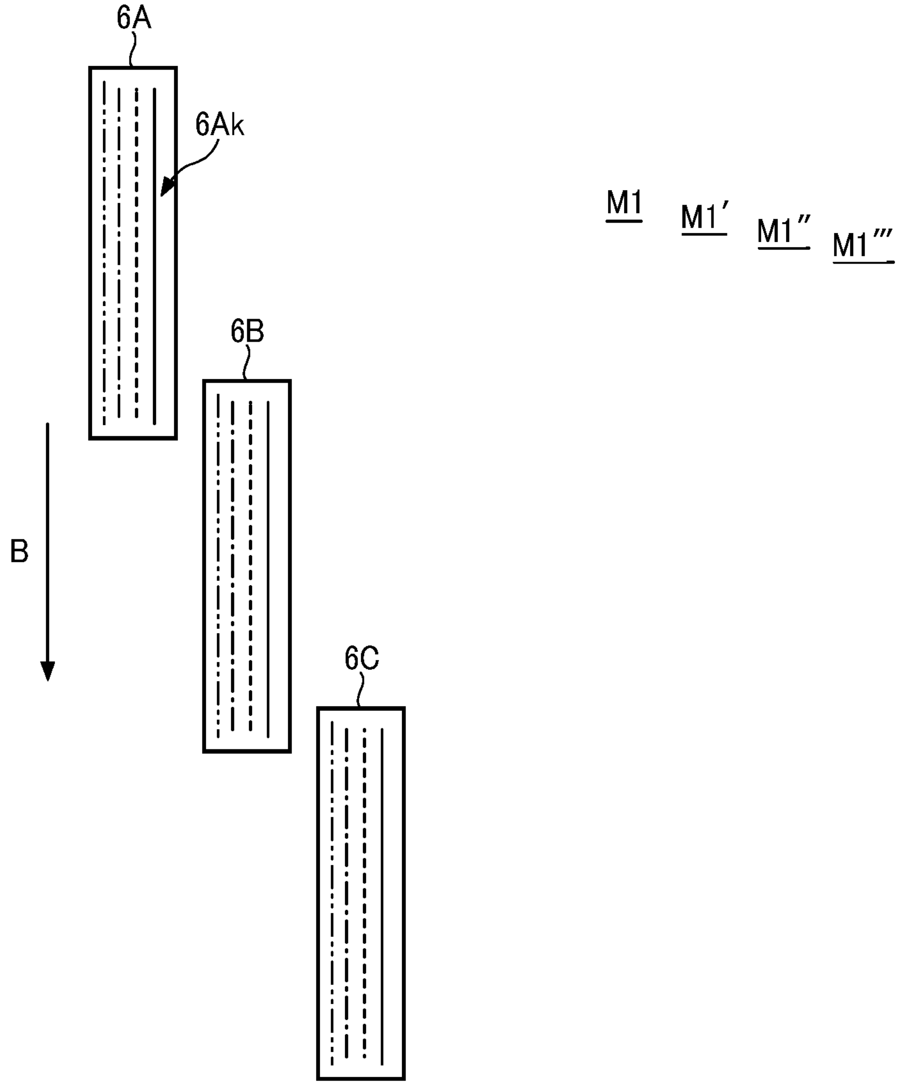
FIG. 18 is a first diagram illustrating an operation of the image forming apparatus according to the embodiment.
Figure 19:
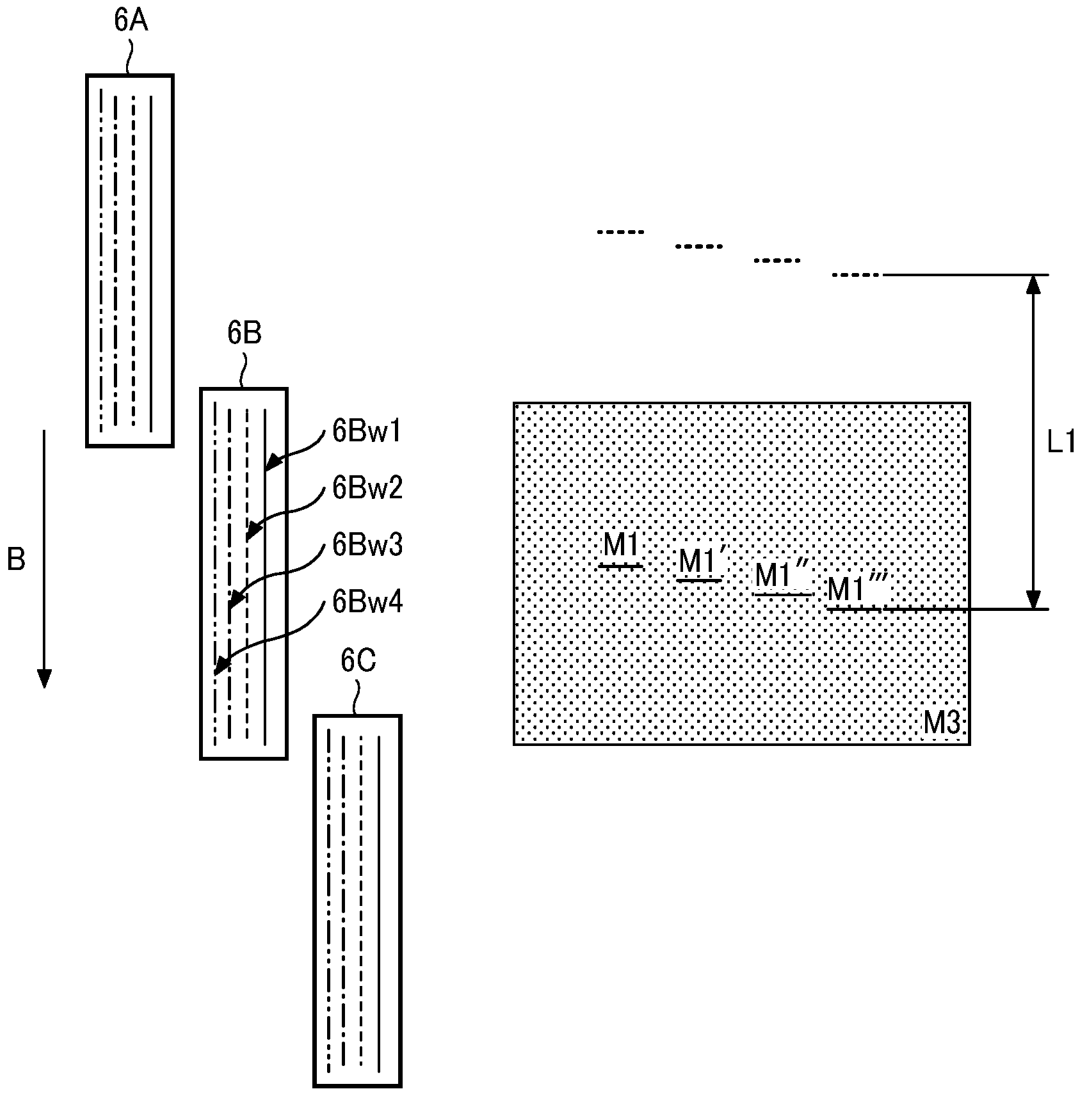
FIG. 19 is a second diagram illustrating an operation of the image forming apparatus according to the embodiment.
Figure 20:
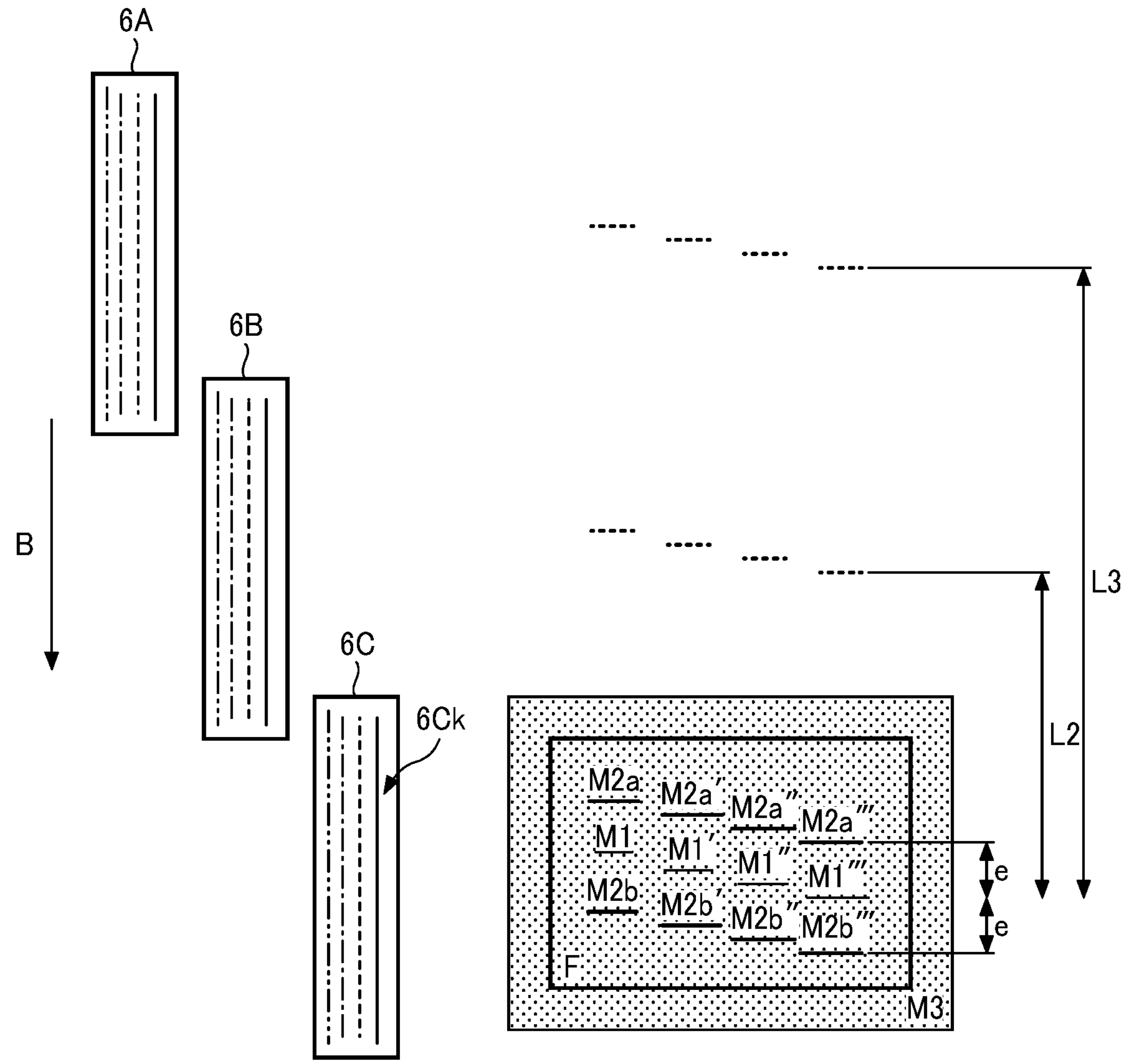
FIG. 20 is a third diagram illustrating an operation of the image forming apparatus according to the embodiment.
Figure 21:
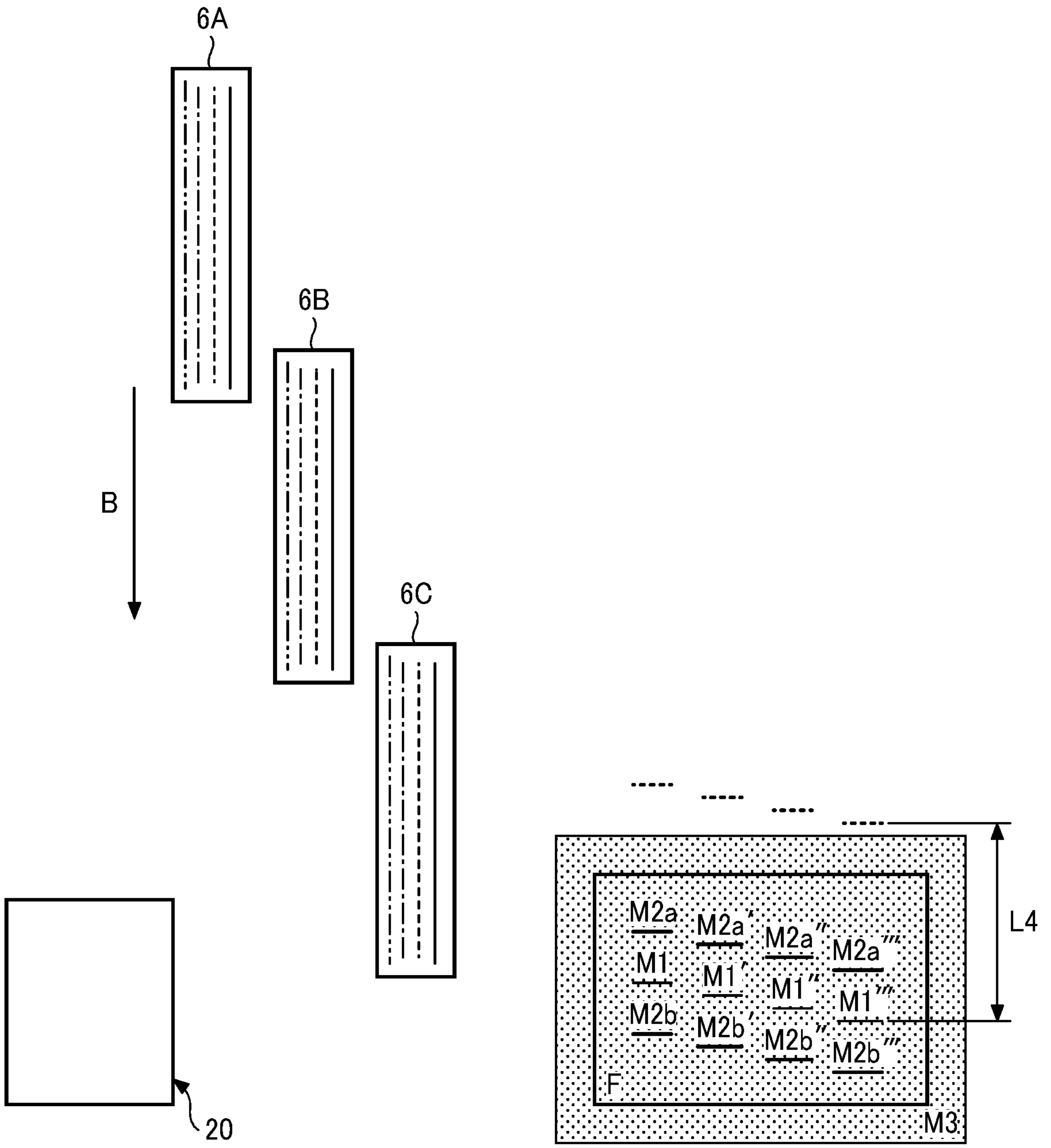
FIG. 21 is a fourth diagram illustrating an operation of the image forming apparatus according to the embodiment.
Figure 22A:
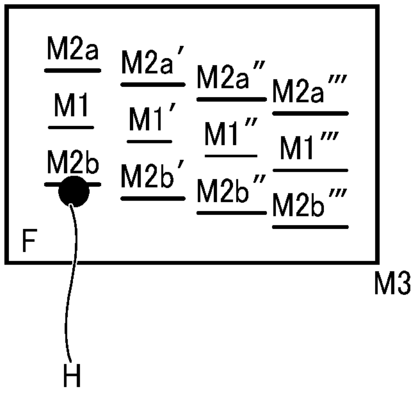
FIG. 22A is a diagram describing an action of a mask image.
Figure 22B:
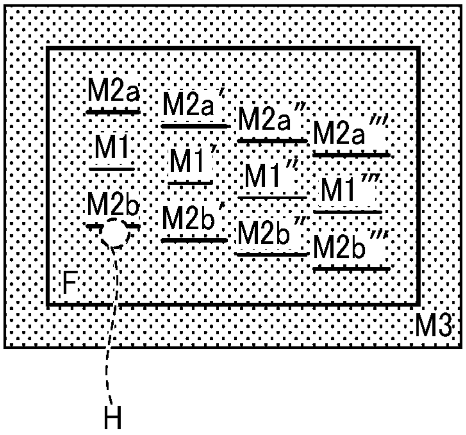
FIG. 22B is a diagram describing the action of the mask image.
Figure 27:
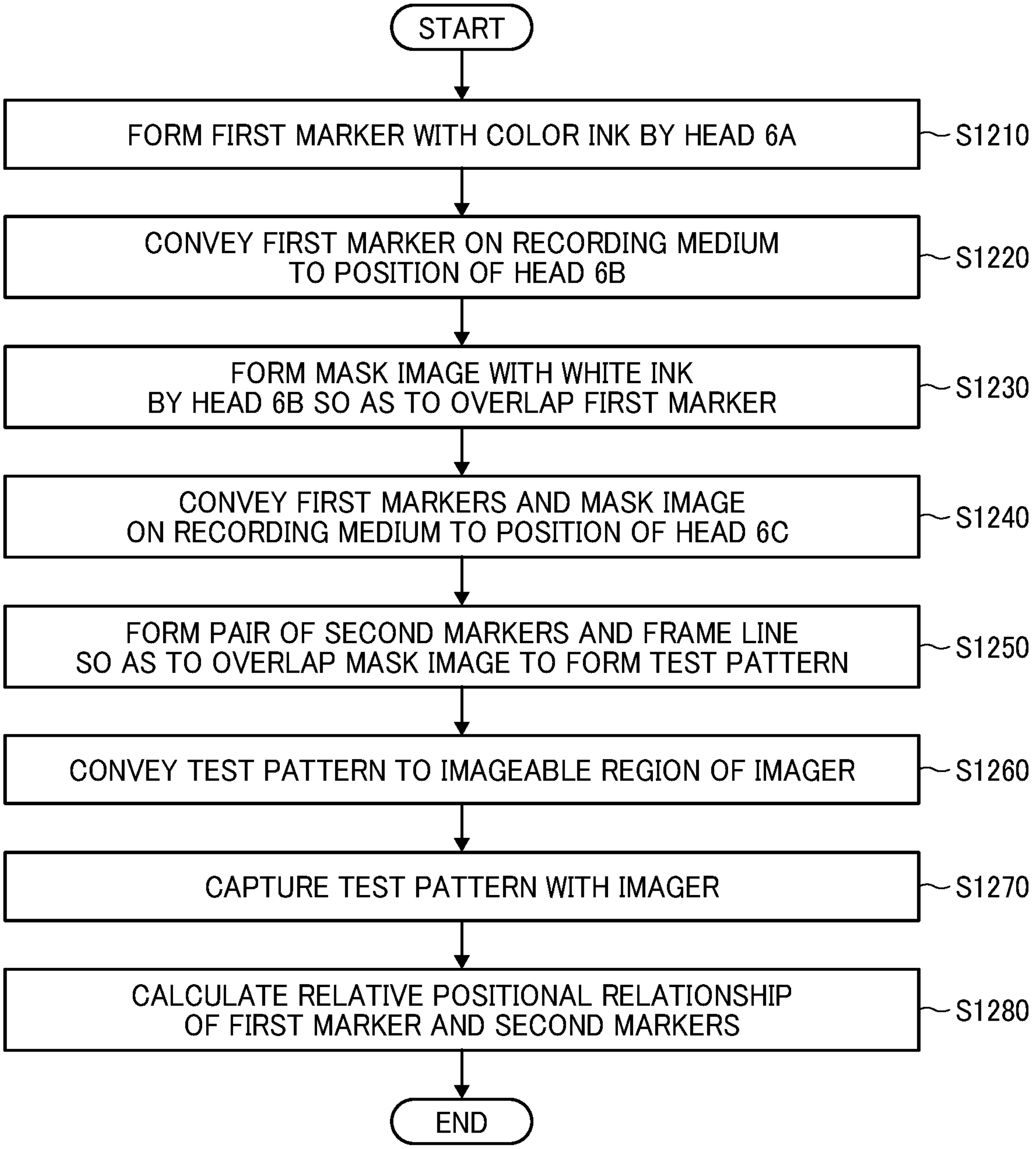
FIG. 27 is a flowchart of an operation of the image forming apparatus, according to an embodiment of the present disclosure.

The operations of the image forming apparatus 100 will be described with reference to FIGS. 18 to 22B, and 27. FIGS. 18 to 21 are diagrams illustrating the operations of the image forming apparatus, in which FIG. 18 is a first view, FIG. 19 is a second view, FIG. 20 is a third view, and FIG. 21 is a fourth view. FIGS. 22A and 22B are diagram describing the action of the mask image M3. FIG. 27 is a flowchart illustrating an operation of the image forming apparatus 100.

When the user of the image forming apparatus 100 selects and sets a specific type of the recording medium P by the image forming apparatus 100, the CPU 110 outputs the test pattern TP by the pattern forming unit 111 according to the procedure of the method for forming the test pattern TP described in FIG. 16. The user may switch between the types of the recording medium P for outputting the test pattern TP by selecting whether the recording medium P is transparent using the operation device and issuing an instruction to the image forming apparatus 100.

In step S1210 of FIG. 27, as illustrated in FIG. 18, the image forming apparatus 100 forms first markers M1, M1', M1'', and M1''' by nozzle rows 6AK arranged in the head 6A on the upstream side of the recording medium P in the sub-scanning direction. The first marker M1 is a generic term for the first markers M1, M1', M1'', and M1'''.

Subsequently, in step S1220 of FIG. 27, the image forming apparatus 100 intermittently conveys the first markers M1, M1', M1'', and M1''' on the recording medium P by the actual conveyance amount L1 in N1 steps, based on a number of intermittent conveying, to the position of the head 6B.

Subsequently, after conveying the first marker M1 to the position of the head 6B, in step S1230 of FIG. 27, the image forming apparatus 100 uses the nozzle rows 6Bw1, 6Bw2, 6Bw3, and 6Bw4 arranged in the head 6B, to form the mask image M3 with white ink so as to overlap the first markers M1, M1', M1'', and M1''', as illustrated in FIG. 19.

Subsequently, after forming the mask image M3 so as to overlap the first markers M1, M1', M1'', and M1''' with white ink, in step S1240 of FIG. 27, the image forming apparatus 100 intermittently conveys the actual conveyance amount L2 in N2 steps, based on a predetermined number of intermittent conveying, to the position of the head 6C.

Subsequently, after conveying the first markers M1, M1', M1'', and M1''' formed so as to overlap the mask image M3 to the position of the head 6C, in step S1250 of FIG. 27, the image forming apparatus 100 forms the pair of second markers M2*a*, M2*a*', M2*a*'', M2*a*''', M2*b*, M2*b*', M2*b*'', and M2*b*''' and the frame line F on the mask image M3 to form the test pattern TP. The second markers M2*a* and M2*b* are generic notations of M2*a*', M2*a*'', M2*a*''', M2*b*, M2*b*', M2*b*'', and M2*b*'''.

As illustrated in FIG. 20, the nozzles used to form the pair of second markers M2*a*, M2*a*', M2*a*'', M2*a*''', M2*b*, M2*b*', M2*b*'', and M2*b*''' are nozzles whose mutual positional relationships with respect to the first markers M1, M1', M1'', and M1''' have an equal distance e when the first markers M1, M1', M1'', and M1''' are conveyed by the ideal conveyance amount L3.

Subsequently, the image forming apparatus 100 forms the pair of second markers M2*a*, M2*a*', M2*a*'', M2*a*''', M2*b*, M2*b*', M2*b*'', and M2*b*''' and the frame line F with by the head 6C, completes the test pattern TP, in step S1260 of FIG. 27, then conveys the test pattern TP by the distance L4, and moves the test pattern TP to the imageable region of the imager 20.

Subsequently, as illustrated in FIG. 21, the image forming apparatus 100 moves to the imageable region of the imager 20, and then captures of an image of the test pattern TP by the imager 20 in step S1270 of FIG. 27. Then, in step S1280 of FIG. 27, the image forming apparatus 100 calculates the relative positional relationship between the first markers M1, M1', M1'', and M1''' and the pair of second markers M2*a*, M2*a*', M2*a*'', M2*a*'', M2*b*, M2*b*', M2*b*'', and M2*b*'''.

As illustrated in FIG. 22A, when the image forming apparatus 100 captures an image of the test pattern TP by the imager 20, the position of a through hole H provided in the platen 16 and the test pattern TP may overlap with each other. When the through hole H overlaps the first markers M1, M1', M1'', and M1''' or the pair of second markers M2*a*, M2*a*', M2*a*'', M2*a*''', M2*b*, M2*b*', M2*b*'', and M2*b*''', the relative positional relationship may not be correctly calculated.

As illustrated in FIG. 22B, in the present embodiment, the first markers M1, M1', M1'', and M1''', or the pair of second markers M2*a*, M2*a*', M2*a*'', M2*a*'', M2*b*, M2*b*', M2*b*'', and M2*b*''' are formed on or under the mask image M3. Accordingly, even when the through hole H overlaps the first markers M1, M1', M1'', and M1''' or the pair of second markers M2*a*, M2*a*', M2*a*'', M2*a*''', M2*b*, M2*b*', M2*b*'', and M2*b*''', the through hole H is hidden by the mask image M3, so that the image forming apparatus 100 can correctly calculate the relative positional relationship.

In the present embodiment, black ink is used to form the first markers M1, M1', M1'', and M1''' of the test pattern TP and the pair of second markers M2*a*, M2*a*', M2*a*'', M2*a*''', M2*b*, M2*b*', M2*b*'', and M2*b*''', but ink of another color may be used. Different colors may be used for the first markers M1, M1', M1'', and M1''' and the pair of second markers M2*a*, M2*a*', M2*a*'', M2*a*''', M2*b*, M2*b*', M2*b*'', and M2*b*'''.

In the present embodiment, white ink is used as the mask image M3 of the test pattern TP, but ink other than white ink may be used as long as there is a contrast difference between the first markers M1, M1', M1'', and M1''' and the pair of second markers M2*a*, M2*a*', M2*a*'', M2*a*''', M2*b*, M2*b*', M2*b*'', and M2*b*'''.

Operational Effects of Image Forming Apparatus

There is conventionally known a technique for detecting a shift in a conveyance amount of a recording medium by an image forming apparatus on the basis of a test pattern formed on the recording medium.

For example, a configuration is known in which an actual distance of a positional shift amount corresponding to a positional shift amount in an image captured by an imager is calculated, and a conveyance amount of a target object is corrected for each moving direction of a carriage. In this image forming apparatus, a pair of first markers is formed by a head, a test pattern in which a second marker is formed by a head having an inclination different from that at the time of forming the pair of first markers is imaged, a ratio between a distance between the first markers and a positional shift amount of the second marker is calculated from a captured image, and an actual distance of the positional shift amount of the second marker is calculated on the basis of the ratio to adjust a parameter related to a conveyance amount.

However, in the above-described technique, if the recording medium is transparent or the like, the recording medium is affected by the state of the conveyance surface on the rear surface of the recording medium, and thus, the test pattern formed on the recording medium may not be detected and the shift in the conveyance amount may not be correctly detected.

In the present embodiment, the image forming apparatus 100 includes the head 6 including the first nozzle 601 that discharges color ink, the second nozzle 602 that discharges base ink, and the third nozzle 603 that is arranged at a position different from the first nozzle 601 in the sub-scanning direction (conveyance direction of the recording medium P) and discharges color ink. The image forming apparatus 100 includes the controller 130 that controls the relative movement between the recording medium P and the head 6 along the main scanning direction, the relative movement of the actual conveyance amount L1 (predetermined conveyance amount) between the recording medium P and the head 6 along the conveyance direction, and the discharge of the color ink and the base ink by the head 6. The image forming apparatus 100 further includes the imager 20 (serving as a reader) that reads the test pattern TP formed on the recording medium P with the color ink discharged from the head 6.

The controller 130 performs control to form the first marker M1 (first test pattern) on the recording medium P with the color ink discharged from the first nozzle 601, form the second markers M2*a* and M2*b* (second test pattern) on the recording medium P with the color ink discharged from the third nozzle 603, and form the mask image M3 so as to overlap on or under the first marker M1 and the second markers M2*a* and M2*b* with the base ink discharged from the second nozzle 602. The imager 20 reads the positions of the first marker M1 and the second markers M2*a* and M2*b*.

With the above configuration, the image forming apparatus 100 can read the first marker M1 and the second markers M2*a* and M2*b* arranged at different positions in the relative conveyance direction of the head 6 and the recording medium P, by the imager 20 with the mask image M3 as a background. As a result, in the present embodiment, it is possible to provide the image forming apparatus 100 that can correctly detect the first marker M1 and the second markers M2*a* and M2*b* without being affected by the state of the conveyance surface on the back surface of the recording medium P and can detect the shift of the relative conveyance amount between the recording medium P and the head 6 in the sub-scanning direction.

In the present embodiment, in order to obtain the shift of the conveyance amount in the sub-scanning direction, at least the first nozzle 601 and the third nozzle 603 may be arranged at different positions in the sub-scanning direction, and the positional relationship with the second nozzle 602 is not limited in particular.

In the present embodiment, the carriage 5 moves in the main scanning direction and the recording medium P moves in the sub-scanning direction. However, the present invention is not limited thereto. As long as the recording medium P and the carriage 5 can move relative to each other, the recording medium P or the carriage 5 may move in both the main scanning direction and the sub-scanning direction, or the recording medium P may move in the main scanning direction and the carriage 5 may move in the sub-scanning direction.

In the present embodiment, the head 6 includes the first nozzle 601, the second nozzle 602, and the third nozzle 603 in this order from upstream in the sub-scanning direction. In other words, in the present embodiment, the first nozzle 601 and the third nozzle 603 used to detect the test pattern TP are arranged to be separated in the sub-scanning direction with the second nozzle 602 forming the mask image interposed therebetween. This makes it possible to increase the conveyance amount by which the recording medium P is relatively moved until the formation of the second markers M2*a* and M2*b* on the recording medium P after the formation of the first marker M1 on the recording medium P. Since the image forming apparatus 100 can secure a long conveyance amount, the shift of the conveyance amount can be enlarged and detected more correctly.

In the present embodiment, the controller 130 performs control to form a part of the first marker M1 with the color ink discharged from the first nozzle 601, relatively move the head 6 and the recording medium P in the sub-scanning direction by the actual conveyance amount L1, form the mask image M3 so as to overlap the first marker M1 with the base ink discharged from the second nozzle 602, further relatively move the head 6 and the recording medium P in the sub-scanning direction by the actual conveyance amount L1, and form the second markers M2*a* and M2*b* on the mask image M3 with the color ink discharged from the third nozzle 603. Accordingly, the image forming apparatus 100 can form and read the test pattern TP without performing the rewinding operation of the recording medium P, that is, the operation of relatively moving the recording medium P in the direction opposite to the sub-scanning direction. As a result, the image forming apparatus 100 can accurately read the test pattern TP by the imager 20 without being affected by the skew of the recording medium P that might occur in the rewinding operation or the change in the relative shift of the conveyance amount due to the slip in the conveyance roller 152.

The controller 130 may perform control to form a part of the first marker M1 with the color ink discharged from the first nozzle 601, and form the mask image M3 so as to overlap the first marker M1 with the base ink discharged from the second nozzle 602 at a density at which the part of the first marker M1 does not disappear. Since the image forming apparatus 100 can form the mask image M3 so as to overlap the first marker M1 with the color ink discharged from the first nozzle 601 at a density at which the part of the first marker M1 on the recording medium P does not disappear, it is possible to correctly read the test pattern TP by the imager 20 while maintaining the background effect of the mask image M3.

The head 6 may include a plurality of heads, and the controller 130 may perform control to detect the shift of the relative conveyance control amount between the recording medium P and the head 6 in the sub-scanning direction without performing the rewinding operation of the recording medium P. Since the image forming apparatus 100 can form and read the test pattern TP without performing the rewinding operation of the recording medium P, it is possible to accurately read the test pattern TP by the imager 20 without being affected by the skew of the recording medium P that might occur in the rewinding operation or the change in the relative shift of the conveyance amount due to the slip in the conveyance roller 152.

In the present embodiment, the base ink is white ink. This makes it easy to increase the contrast between the test pattern TP and the mask image.

The base ink may be ink of a color other than white having a predetermined contrast between the first marker M1 and the mask image M3. Also in this case, it is easy to increase the contrast between the test pattern TP and the mask image.

Modifications

Since the embodiment can be variously modified, modifications will be described below.

Arrangement of Head

Figure 23:
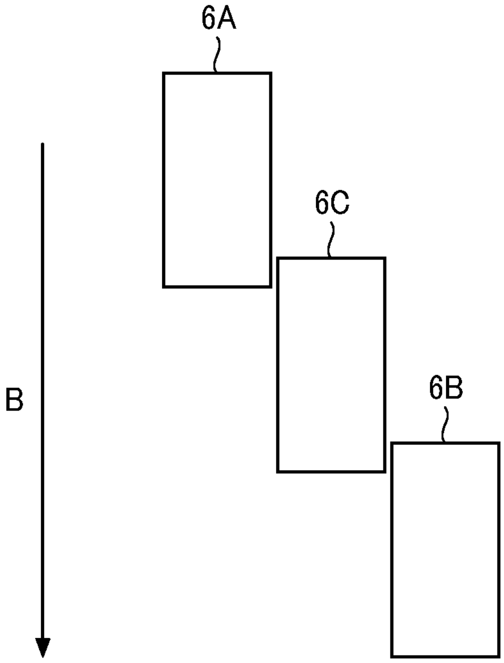
FIG. 23 is a diagram illustrating a first modification of head arrangement.
Figure 24:
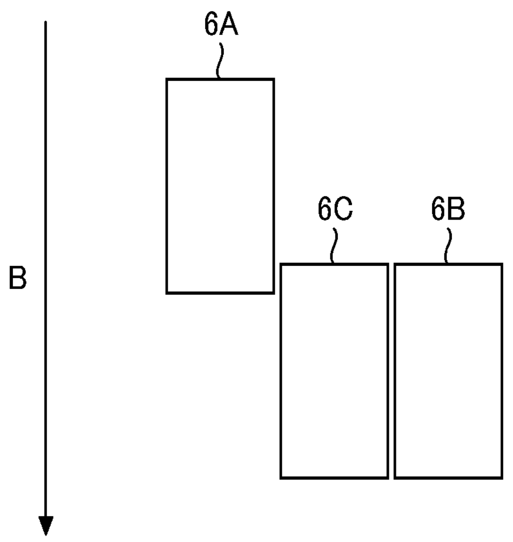
FIG. 24 is a diagram illustrating a second modification of head arrangement.
Figure 25:
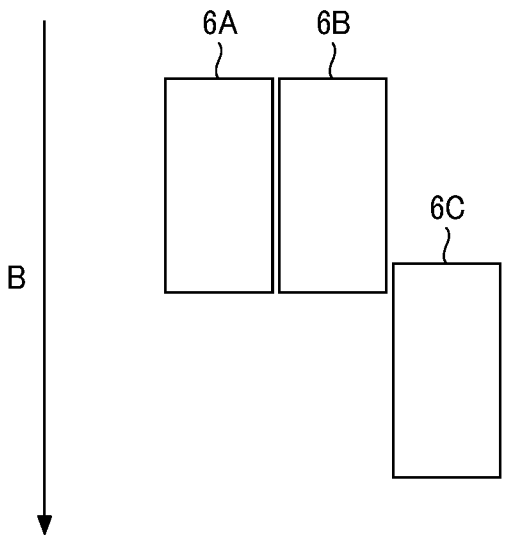
FIG. 25 is a diagram illustrating a third modification of head arrangement.

Modifications of the arrangement of the head 6 will be described with reference to FIGS. 23 to 25. FIGS. 23 to 25 are diagrams illustrating modifications of the arrangement of the head 6, in which FIG. 23 is a first modification, FIG. 24 is a second modification, and FIG. 25 is a third modification.

In FIGS. 23 to 25, a head 6A includes a first nozzle 601 that discharges color ink. A head 6B has a second nozzle 602 that discharges base ink. A head 6C has a third nozzle 603 that discharges color ink.

In the first modification illustrated in FIG. 23, the head 6A discharges the color ink to form a first marker M1 on a recording medium P, and the head 6C discharges the color ink to form second markers M2*a* and M2*b* on the recording medium P. Thereafter, the head 6B discharges the base ink to form a mask image M3 so as to overlap both the first marker M1 and the second markers M2*a* and M2*b*.

In the second modification illustrated in FIG. 24, a head 6A discharges color ink to form the first marker M1 on a recording medium P, and a head 6C discharges color ink to form second markers M2*a* and M2*b* on the recording medium P. Thereafter, the head 6B discharges the base ink to form a mask image M3 so as to overlap both the first marker M1 and the second markers M2*a* and M2*b*. The heads 6C and 6B form the second markers M2*a* and M2*b* and the mask image M3 on the recording medium P by the same movement of a carriage 5 in the main scanning direction.

In the third modification illustrated in FIG. 25, after a head 6A discharges color ink to form a first marker M1 on a recording medium P, a head 6B discharges base ink to form a mask image M3 so as to overlap the first marker M1. The heads 6A and 6B form the first marker M1 and the mask image M3 on the recording medium P by the same movement of a carriage 5 in the main scanning direction. Thereafter, a head 6C discharges color ink to form second markers M2*a* and M2*b* on the recording medium P. The mask image M3 is formed under the second markers M2*a* and M2*b*.

In addition, in the third modification, for example, the length of the head 6B in the sub-scanning direction may be set to a length with which the head 6B overlaps the heads 6A and 6C.

In the embodiment, the color ink and the base ink are discharged in the movement of the carriage 5 in one direction along the main scanning direction. Alternatively, the color ink and the base ink may be discharged in reciprocating movements.

In the second modification and the third modification, in the case of discharging the color ink and the base ink in reciprocating movements, the order of forming the second markers M2*a* and M2*b* and the mask image M3 is reversed between the forward movement and the backward movement. However, the second markers M2*a* and M2*b* can be read by the imager 20 in either order.

Figure 26:
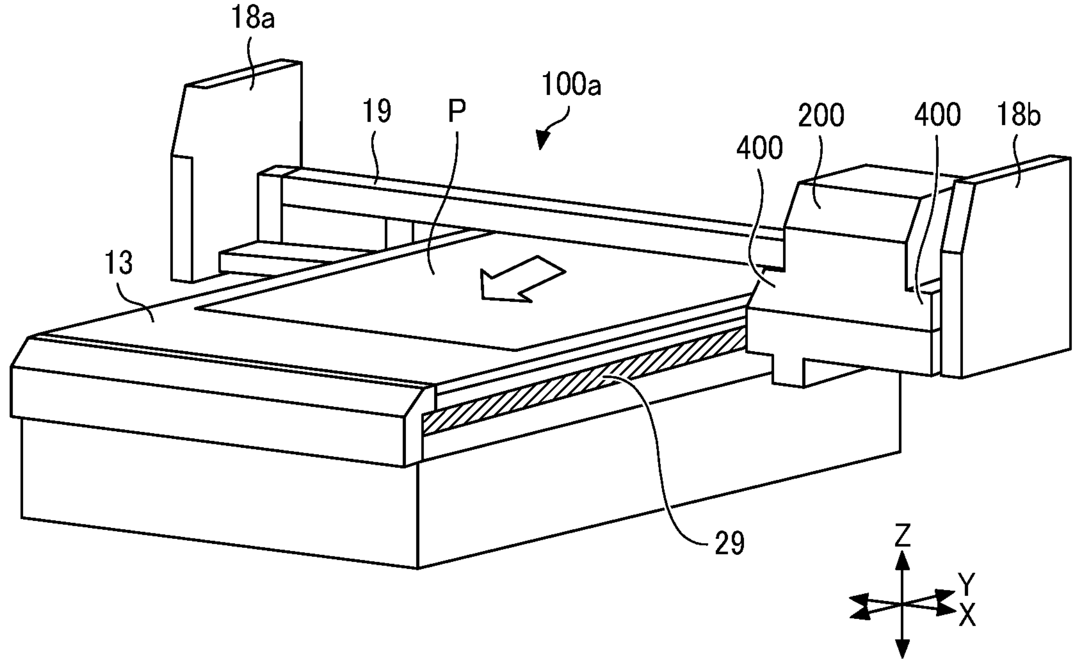
FIG. 26 is a perspective view of a configuration of an image forming apparatus according to a modification of the embodiment.

FIG. 26 is a perspective view of a general arrangement of an image forming apparatus 100*a* according to a modification.

The image forming apparatus 100*a* includes a carriage 200 and a stage 13 on which a recording medium P is placed. The carriage 200 has a plurality of heads with a plurality of nozzles, and forms an image by discharging color ink and base ink from the nozzles of the heads. The nozzles are provided on a surface facing the stage 13.

The carriage 200 has an irradiation unit 400, which is a light source that emits ultraviolet rays, on a surface facing the stage 13. The irradiation unit 400 emits light with a wavelength for curing the liquid discharged from the nozzles.

A guide rod 19 is stretched between left and right side plates 18*a* and 18*b*, and the guide rod 19 holds the carriage 200 so as to be movable in the X direction (main scanning direction).

The carriage 200, the guide rod 19, and the side plates 18*a* and 18*b* are integrally movable in the Y direction (sub-scanning direction) along a guide rail 29 provided at a lower portion of the stage 13. The carriage 200 is held so as to be movable in the Z direction (vertical direction).

In the configuration of FIG. 26, the image forming apparatus 100*a* forms an image by alternately repeating a main scanning operation of discharging ink from the nozzles onto the recording medium P while moving the heads in the main scanning direction and a sub-scanning operation of moving the heads in the sub-scanning direction.

The embodiment also includes an image forming method. For example, an image forming method is an image forming method by an image forming apparatus, in which the image forming apparatus discharges color ink and base ink by a head including a first nozzle that discharges the color ink, a second nozzle that discharges the base ink, and a third nozzle that is arranged at a position different from the first nozzle in a conveyance direction of a recording medium and discharges the color ink, a controller controls relative movement of the recording medium and the head along a main scanning direction intersecting the conveyance direction, relative movement of a predetermined conveyance amount between the recording medium and the head along the conveyance direction, and discharge of the color ink and the base ink by the head, and a reader reads a test pattern formed on the recording medium with the color ink discharged from the head, the controller performs control to form a first test pattern on the recording medium with the color ink discharged from the first nozzle, form a second test pattern on the recording medium with the color ink discharged from the third nozzle, and form a mask image so as to overlap on or under the first test pattern and the second test pattern with the base ink discharged from the second nozzle, and the reader reads positions of the first test pattern and the second test pattern. This image forming method produces advantageous effects similar to those of the above-described image forming apparatus. This image forming method may be implemented by a circuit such as a CPU or an LSI, an IC card, a single module, or the like.

Embodiments also include a program. For example, the program causes an image forming apparatus to: discharge color ink and base ink by a head including a first nozzle that discharges the color ink, a second nozzle that discharges the base ink, and a third nozzle that is arranged at a position different from the first nozzle in a conveyance direction of a recording medium and discharges the color ink; control, by a controller, relative movement of the recording medium and the head along a main scanning direction intersecting the conveyance direction, relative movement of a predetermined conveyance amount between the recording medium and the head along the conveyance direction, and discharge of the color ink and the base ink by the head; read, by a reader, a test pattern formed on the recording medium with the color ink discharged from the head; perform control by the controller to form a first test pattern on the recording medium with the color ink discharged from the first nozzle, form a second test pattern on the recording medium with the color ink discharged from the third nozzle, and form a mask image so as to overlap on or under the first test pattern and the second test pattern with the base ink discharged from the second nozzle; and read, by the reader, read positions of the first test pattern and the second test pattern. This program produces advantageous effects similar to those of the above-described image forming apparatus.

The numbers used in the description of the embodiments, such as ordinal numbers and numerical values that indicates quantity, are all given by way of example to describe the technologies to implement the embodiments of the present invention, and the present invention is not limited to the numbers given in the above description. In addition, the above-describe connections among the components are examples for specifically describing the technology of the present invention, and connections for implementing functions of the present invention are not limited to the above-described examples.

The division of the blocks in the functional block diagrams is an example, and a plurality of blocks may be implemented as one block, one block may be divided into a plurality of blocks, or some functions may be transferred to another block. The functions of a plurality of blocks having similar functions may be processed in parallel or in a time division manner by single hardware or software.

The functions of the above-described embodiments may be implemented by one or more processing circuits. The term “processing circuit” or “circuitry” in the present specification includes a programmed processor to execute each function by software, such as a processor implemented by an electronic circuit, and devices, such as an application specific integrated circuit (ASIC), a digital signal processor (DSP), and a field programmable gate array (FPGA), and conventional circuit modules arranged to perform the recited functions.

Although the preferred embodiments of the present invention have been described above in detail, the present disclosure is not limited to the specific embodiments, and various modifications or alterations can be made within the scope of the gist of embodiments of the present invention described in the claims.

The invention claimed is:

1. An image forming apparatus comprising:
- a head including a first nozzle to discharge color ink, a second nozzle to discharge base ink, and a third nozzle disposed at a position different from the first nozzle in a conveyance direction of a recording medium, to discharge color ink;
- processing circuitry configured to:
  - control relative movement of the recording medium and the head along a main scanning direction intersecting the conveyance direction, relative movement of a conveyance amount between the recording medium and the head along the conveyance direction, and discharge of the color ink and the base ink by the head; and
  - control the head to form a first test pattern on the recording medium with the color ink discharged from the first nozzle, form a second test pattern on the recording medium with the color ink discharged from the third nozzle, and form a mask image with the base ink discharged from the second nozzle, wherein the mask image is overlapping on the first test pattern and the second test pattern is overlapping on the mask image;
- a reader configured to read positions of the first test pattern formed on the recording medium with the color ink discharged from the first nozzle and the second test pattern formed on the recording medium with the color ink discharged from the third nozzle, wherein the processing circuitry performs control to form a part of the first test pattern with the color ink discharged from the first nozzle, and form the mask image overlapping the first test pattern at a density at which the part of the first test pattern does not disappear, with the base ink discharged from the second nozzle.

2. The image forming apparatus according to claim 1,
- wherein the head includes the first nozzle, the second nozzle, and the third nozzle in order from upstream in the conveyance direction.

3. The image forming apparatus according to claim 2,
- wherein the processing circuitry performs control to form a part of the first test pattern with the color ink discharged from the first nozzle, then relatively move the head and the recording medium by the conveyance amount in the conveyance direction, form the mask image overlapping the first test pattern with the base ink discharged from the second nozzle, then further relatively move the head and the recording medium by the conveyance amount in the conveyance direction, and form the second test pattern on the mask image with the color ink discharged from the third nozzle.

4. The image forming apparatus according to claim 1, wherein the head includes a plurality of heads, and the processing circuitry performs control to detect a shift in a relative conveyance amount between the recording medium and the head in the conveyance direction without performing an operation of relatively moving the recording medium in a direction opposite to the conveyance direction.

5. The image forming apparatus according to claim 1, wherein the base ink is white ink.

6. The image forming apparatus according to claim 1, wherein the base ink is ink of a color other than white having a predetermined contrast between the first test pattern and the mask image.

7. An image forming method to be executed by an image forming apparatus including a head, the method comprising:

discharging color ink from a first nozzle of the head, base ink from a second nozzle of the head, and color ink from a third nozzle of the head disposed at a position different from the first nozzle in a conveyance direction of a recording medium;

controlling relative movement of the recording medium and the head along a main scanning direction intersecting the conveyance direction, relative movement of a conveyance amount between the recording medium and the head along the conveyance direction, and discharge of the color ink and base ink by the head;

controlling the head to form a first test pattern on the recording medium with the color ink discharged from the first nozzle, to form a second test pattern on the recording medium with the color ink discharged from the third nozzle, and to form a mask image with the base ink discharged from the second nozzle, wherein the mask image is overlapping on the first test pattern and the second test pattern is overlapping on the mask image; and reading positions of the first test pattern formed on the recording medium with the color ink discharged from the first nozzle and the second test pattern formed on the recording medium with the color ink discharged from the third nozzle, wherein the controlling the head includes control to form a part of the first test pattern with the color ink discharged from the first nozzle, and form the mask image overlapping the first test pattern at a density at which the part of the first test pattern does not disappear, with the base ink discharged from the second nozzle.

8. A non-transitory storage medium storing a plurality of instructions which, when executed by one or more processors, causes the processors to perform a method, the method comprising:

discharging color ink from a first nozzle of a head, base ink from a second nozzle of the head, and color ink from a third nozzle of the head disposed at a position different from the first nozzle in a conveyance direction of a recording medium;

controlling relative movement of the recording medium and the head along a main scanning direction intersecting the conveyance direction, relative movement of a conveyance amount between the recording medium and the head along the conveyance direction, and discharge of the color ink and the base ink by the head;

controlling the head to form a first test pattern on the recording medium with the color ink discharged from the first nozzle, to form a second test pattern on the recording medium with the color ink discharged from the third nozzle, and to form a mask image with the base ink discharged from the second nozzle, wherein the mask image is overlapping on the first test pattern and the second test pattern is overlapping on the mask image; and reading positions of the first test pattern formed on the recording medium with the color ink discharged from the first nozzle and the second test pattern formed on the recording medium with the color ink discharged from the third nozzle, wherein controlling the head includes control to form a part of the first test pattern with the color ink discharged from the first nozzle, and form the mask image overlapping the first test pattern at a density at which the part of the first test pattern does not disappear, with the base ink discharged from the second nozzle.

* * * * *